(12) United States Patent
Sato et al.

(10) Patent No.: US 11,789,559 B2
(45) Date of Patent: Oct. 17, 2023

(54) INPUT DEVICE

(71) Applicant: Alps Alpine Co., Ltd., Tokyo (JP)

(72) Inventors: Akira Sato, Miyagi-ken (JP); Satoshi Nakajima, Miyagi-ken (JP); Tomohiro Sasaki, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 18/175,890

(22) Filed: Feb. 28, 2023

(65) Prior Publication Data
US 2023/0280859 A1 Sep. 7, 2023

(30) Foreign Application Priority Data

Mar. 3, 2022 (JP) ................................. 2022-032835

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04108* (2013.01)

(58) Field of Classification Search
None
See application file for complete search history.

(56) References Cited

U.S. PATENT DOCUMENTS

| 2014/0028557 | A1* | 1/2014 | Otake ................ G06F 3/03547 345/158 |
| 2020/0319791 | A1 | 10/2020 | Murayama |
| 2022/0291814 | A1 | 9/2022 | Nakamura et al. |

* cited by examiner

*Primary Examiner* — Stephen T. Reed
(74) *Attorney, Agent, or Firm* — Beyer Law Group LLP

(57) ABSTRACT

An input device includes a top panel having an operation surface, a detection unit configured to detect a capacitance corresponding to a distance between the operation surface and an object, and a controller configured to determine, based on a detection result from the detection unit, a relative state between the operation surface and the object to be one out of a non-detection state and a plurality of states. The controller measures, for each of the plurality of states, a duration in which the capacitance is greater than or equal to a corresponding one of capacitance thresholds set for the plurality of states, and determines, using the durations and the time thresholds and capacitance thresholds set for the plurality of states, the relative state to be one out of the non-detection state and the plurality of states.

9 Claims, 13 Drawing Sheets

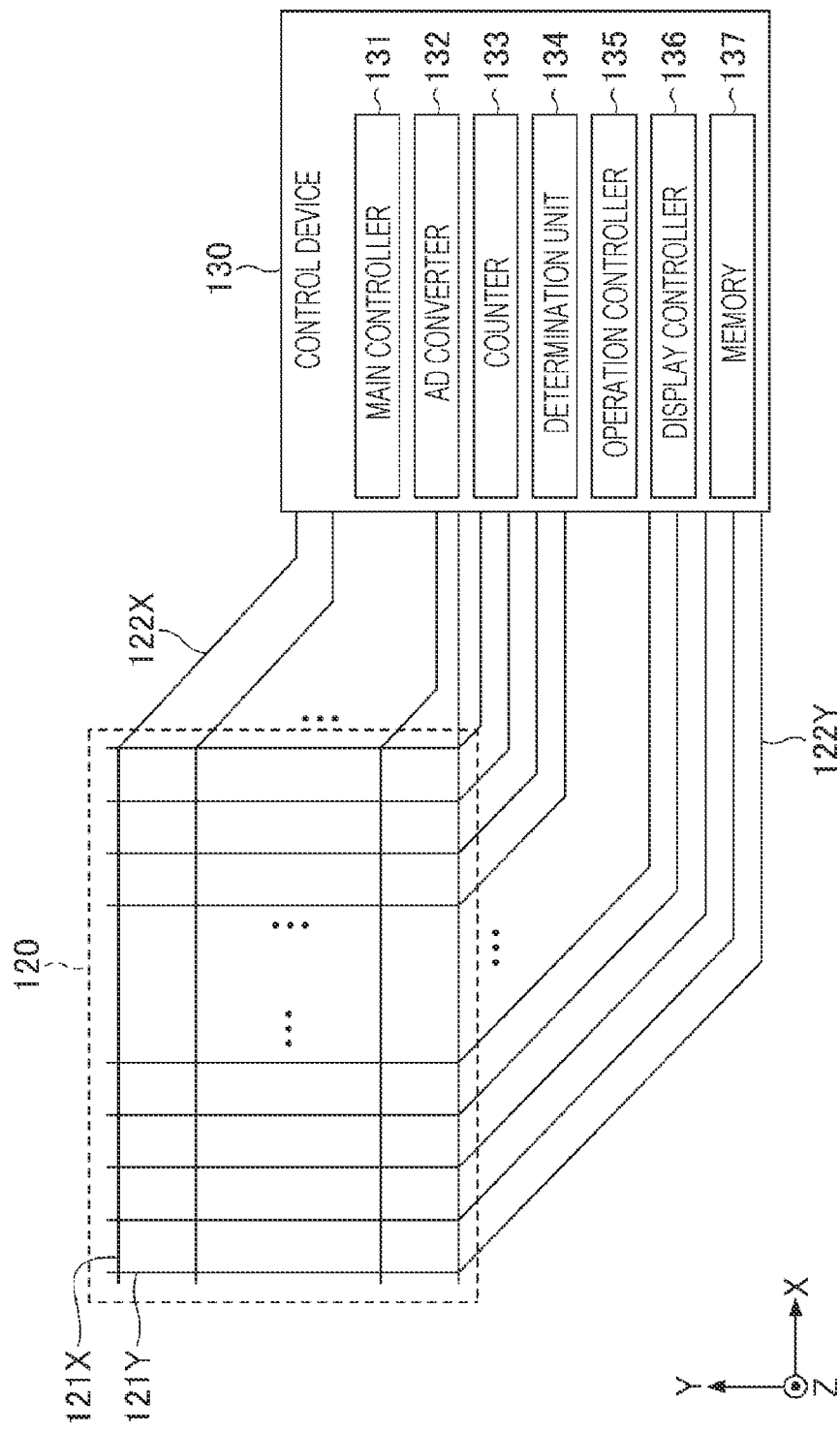

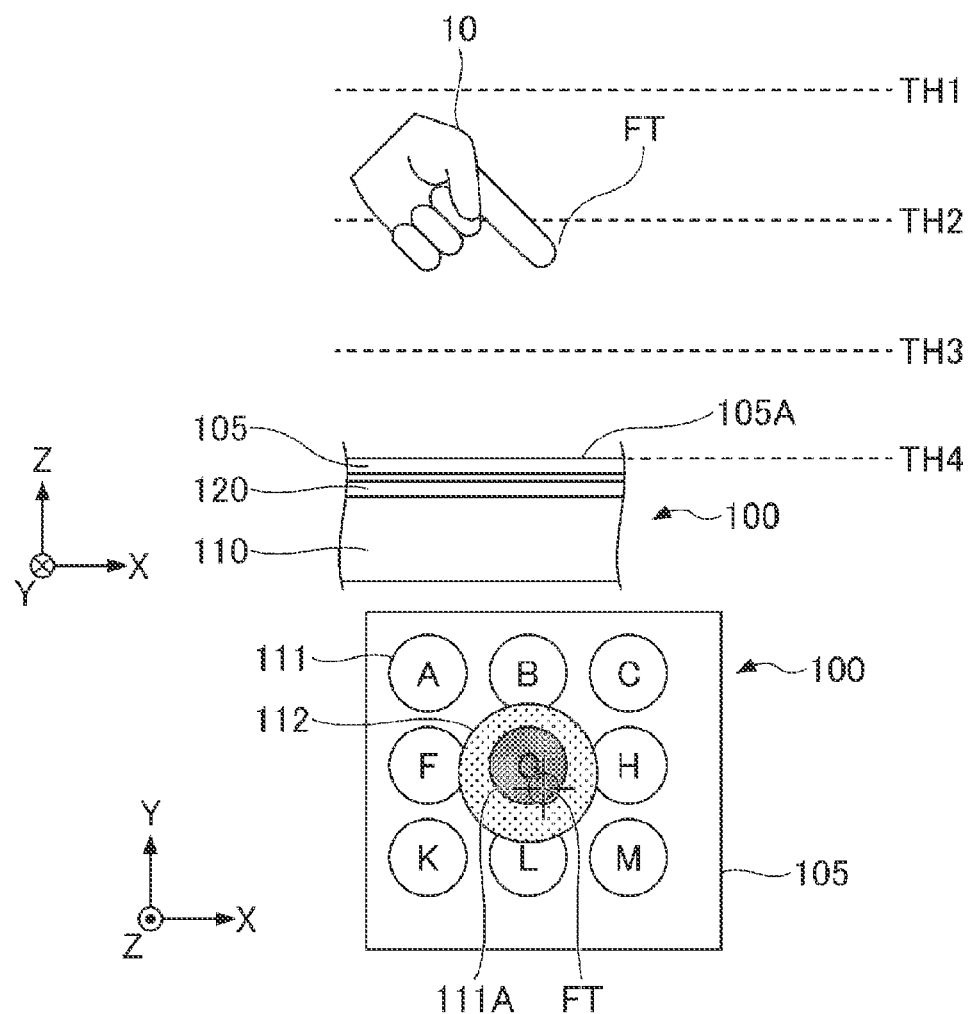

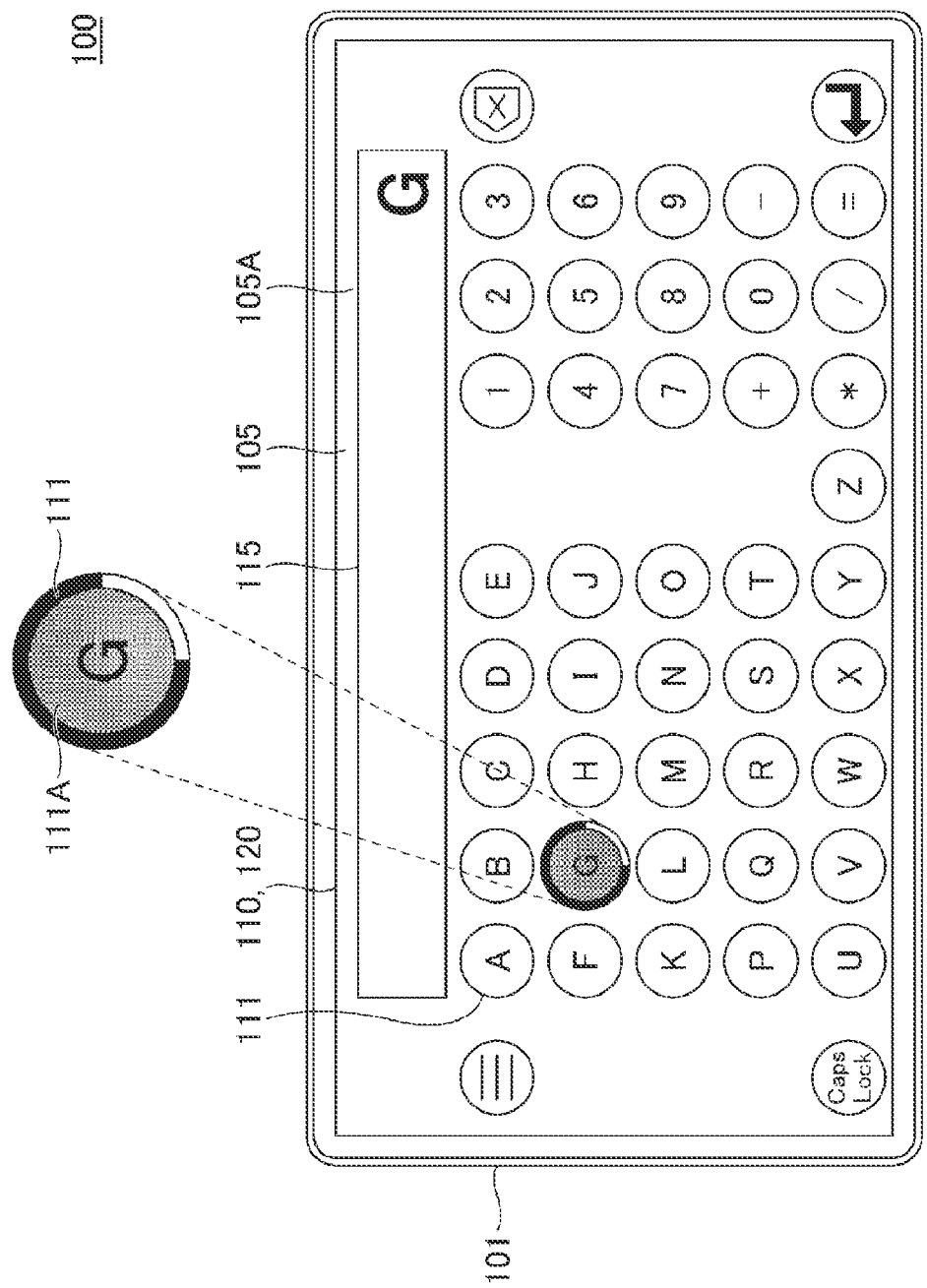

INPUT DEVICE

CLAIM OF PRIORITY

This application claims benefit of Japanese Patent Application No. 2022-032835 filed on Mar. 3, 2022, which is hereby incorporated by reference.

BACKGROUND OF THE INVENTION

1. Field of the Invention

The present disclosure relates to an input device.

2. Description of the Related Art

Hitherto, there has been an input device for accepting a specific contactless operation performed on an operation screen by an object. The input device includes a display controller that displays the operation screen on a display surface, and a detection unit that detects the position of the object in a plurality of midair sensing layers formed so as to be arranged in a direction substantially perpendicular to the display surface (for example, see US2020/0319791A1).

In a case where the position of an object such as a hand is detected on the basis of capacitance, noise generated by, for example, a display device or other electronic devices around the detection unit may be detected by the detection unit. The existing input device does not consider such noise in a case where the existing input device detects at which one of the plurality of midair sensing layers the object is positioned.

Thus, the present disclosure provides an input device that can quickly determine the position of an object in the plurality of midair sensing layers while reducing the effect of noise.

SUMMARY OF THE INVENTION

An input device according to an embodiment of the present disclosure includes a top panel having an operation surface, a detection unit configured to detect a capacitance corresponding to a distance between the operation surface and an object, and a controller configured to determine, based on a detection result from the detection unit, a relative state between the operation surface and the object to be one out of a non-detection state, in which the object is not detected, and a plurality of states other than the non-detection state. The controller measures, for each of the plurality of states, a duration in which the capacitance is greater than or equal to a corresponding one of a plurality of capacitance thresholds set for the plurality of respective states, determines whether or not, for each of the plurality of durations measured and obtained for the plurality of respective states, the duration is greater than or equal to a corresponding one of a plurality of time thresholds set for the plurality of respective states, determines, in a case where none of the plurality of durations is greater than or equal to a corresponding one of the plurality of time thresholds, that the relative state is the non-detection state, and determines, in a case where any one or more durations among the plurality of durations are greater than or equal to the corresponding one or more of the time thresholds, that the relative state is a state whose capacitance threshold is highest among one or more states included in the plurality of states, the one or more states corresponding to the one or more durations.

An input device can be provided that can quickly determine the position of an object in the plurality of midair sensing layers while reducing the effect of noise.

BRIEF DESCRIPTION OF THE DRAWINGS

FIG. 3 is a diagram illustrating an example of the configuration of an electrostatic sensor and a control device of the input device;

FIG. 4A is a diagram for describing operations of the input device in time series when the input device is operated;

FIG. 5 is a diagram illustrating the input device that is in a state where a hovering input to a selected GUI button is confirmed;

DESCRIPTION OF THE PREFERRED EMBODIMENTS

Figure 1:
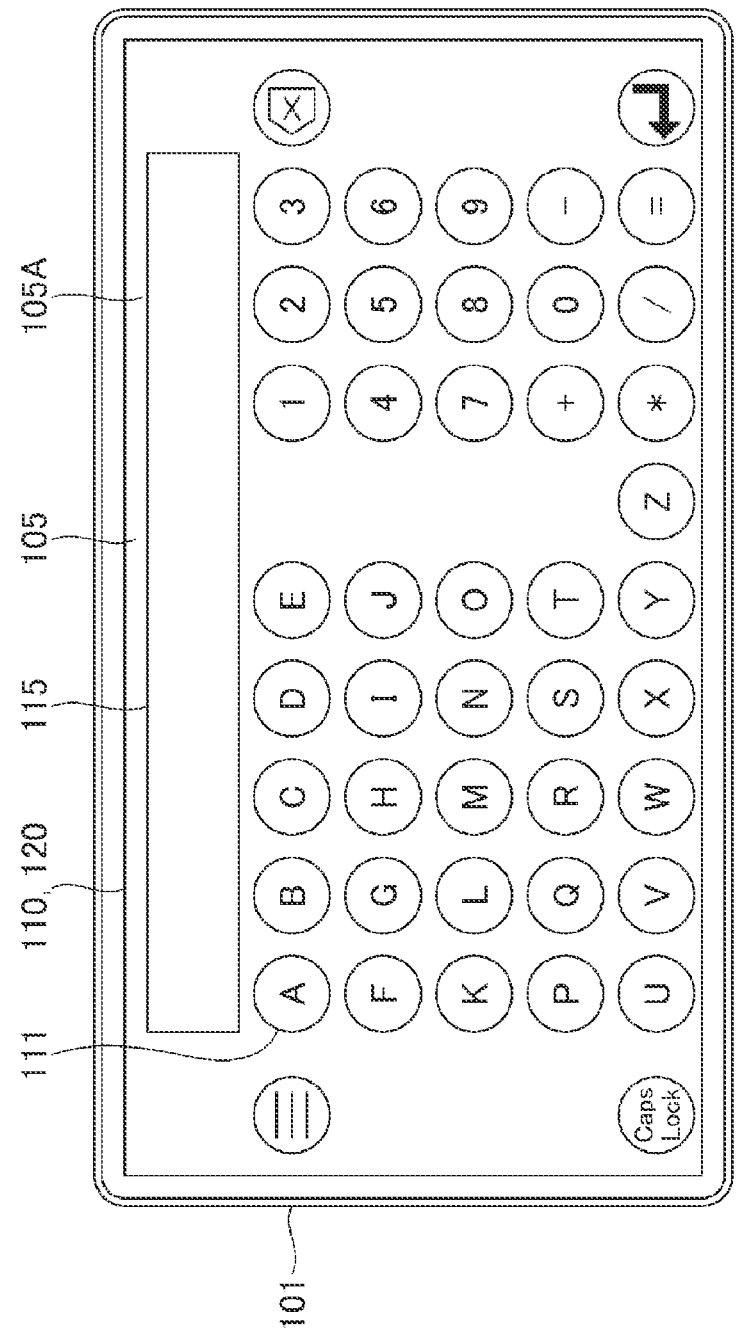
FIG. 1 is a diagram illustrating an example of the configuration of an input device according to an embodiment.
Figure 2:
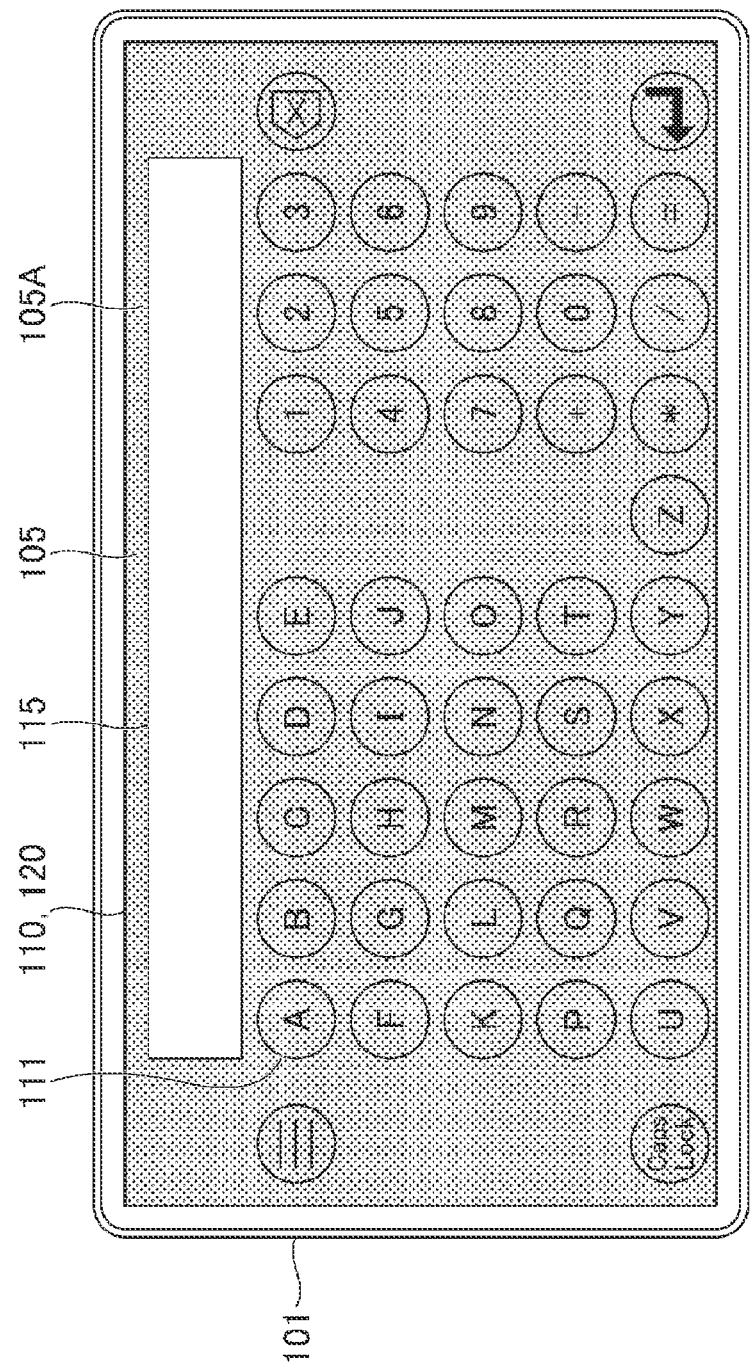
FIG. 2 is a diagram illustrating an example of the configuration of the input device according to the embodiment.

The following describes an embodiment in which an input device according to the present disclosure is used.
<Embodiments>
FIGS. 1 and 2 are diagrams illustrating an example of the configuration of an input device 100 according to an embodiment. FIG. 1 illustrates the input device 100 being in an active state and illustrates a state where a display device 110 displays an input image. When the display device 110 displays the input image, the input device 100 is in an input mode. The input mode is a mode in which an operation can be input to the input device 100. FIG. 2 illustrates the input device 100 being in a standby state and illustrates a state where the display device 110 displays a standby image. When the display device 110 displays the standby image, the input device 100 is in a power-saving mode. When the input device 100 is in the standby state, the screen is almost entirely grayed out on the display device 110, and the display device 110 is in a low power consumption state. FIG. 3 is a diagram illustrating an example of the configuration of an electrostatic sensor 120 and a control device 130 of the input device 100. The display device 110 is an example of a display unit. The electrostatic sensor 120 is an example of a detection unit. The control device 130 is an example of a controller.

In the following, the XYZ coordinate system is defined, and description will be made. A direction parallel to the X axis (an X direction), a direction parallel to the Y axis (a Y direction), and a direction parallel to the Z axis (a Z direction) are orthogonal to each other. In the following, the −Z direction will be described as a direction toward the electrostatic sensor 120, and the +Z direction will be described as a direction away from the electrostatic sensor 120. A plan view refers to an XY plane view. Moreover, in the following, the lengths, widths, and thicknesses, for example, of individual units may be illustrated in an exaggerated manner in order to facilitate understanding of the configurations.

The input device 100 may be, for example, a tablet input device or an input unit of an automatic teller machine (ATM) deployed in a store, a facility, or the like and used by a large number of unspecified users. The input device 100 may be an input unit of a cooking appliance, which needs to be kept clean. Moreover, the input device 100 may be, for example, a tablet computer, a smartphone, or a gaming device for personal use.

<Overall Configuration of Input Device 100>

The input device 100 includes a housing 101, a top panel 105, the display device 110, the electrostatic sensor 120, and the control device 130. In FIGS. 1 and 2, the control device 130 (see FIG. 3) is omitted; however, in one example, the control device 130 is provided under the display device 110 and the electrostatic sensor 120 in the housing 101. The input device 100 includes the electrostatic sensor 120 and the control device 130 illustrated in FIG. 3.

<Housing 101 and Top Panel 105>

The housing 101 is a case that houses the display device 110, the electrostatic sensor 120, and the control device 130 and that is made of, for example, resin or metal. The display device 110 is arranged under the electrostatic sensor 120, which is transparent, in one example, and is visually recognizable through an operation surface 105A, which is a top surface of the top panel 105, which is transparent and is provided in an opening portion provided in the top of the housing 101.

<Types of Operation Methods for Input Device 100>

There are four types of operation methods for the input device 100 such as a proximity operation, a selection operation, a confirmation operation, and a contact operation. When determining an operation method, the input device 100 uses a plurality of capacitance thresholds and a plurality of time thresholds. The plurality of time thresholds are used to prevent an operation method from being erroneously determined when sudden noise occurs, for example. For each operation method, in a case where a state where a capacitance detected by the electrostatic sensor 120 is greater than or equal to a corresponding capacitance threshold continues for a corresponding time threshold or longer, it is determined that an operation has been performed using the operation method. Details of such a determination of an operation method will be described later. In the following, the four operation methods will be described. Note that although the input device 100 can be operated using, for example, a palm other than a fingertip, the following describes a case where an operation is performed using a fingertip. A fingertip is an example of an object.

The proximity operation is an operation in which a fingertip is caused to approach the operation surface 105A without being in contact with the operation surface 105A of the input device 100, and is an operation for switching the input device 100 from the standby state illustrated in FIG. 2 to the active state illustrated in FIG. 1.

The selection operation is an operation in which a GUI button displayed on the display device 110 is selected by causing the fingertip to further approach the operation surface 105A without being in contact with the operation surface 105A of the input device 100 from the state where the proximity operation has been performed.

The confirmation operation is an operation in which an operation input to the selected GUI button is confirmed by causing the fingertip to further approach the operation surface 105A of the input device 100 without being in contact with the operation surface 105A from the state where the selection operation has been performed. The confirmation operation is an operation in which an operation input is performed in a contactless manner, and is an operation in which the input device 100 is operated in a contactless manner without a fingertip touching the operation surface 105A. An operation input performed in a contactless manner through the selection operation and the confirmation operation may be referred to as a hovering input or a touchless input.

The contact operation is an operation in which the operation input to the selected GUI button is confirmed by causing the fingertip to further approach and touch the operation surface 105A of the input device 100 from the state where the selection operation has been performed. The contact operation may be referred to as a touch input.

<Display Device 110>

The display device 110 is a liquid crystal display or an organic electroluminescent (EL) display in one example. The display device 110 performs display to realize a graphical user interface (GUI). The display device 110 displays images of GUI buttons 111 and an image of an input content display unit 115, which displays a cursor and input content. The GUI buttons 111 are an example of operation units and are arranged in a matrix manner in a plan view in an example. Moreover, the GUI buttons 111 have circular shapes mimicking push buttons in an example.

In FIGS. 1 to 3, 45 GUI buttons 111 are illustrated in an example, which are 26 GUI buttons 111 for alphabets, 15 GUI buttons 111 in a numeric keypad for numbers and so forth, and 4 GUI buttons 111 such as a menu key (an upper left key with three lines), a Caps Lock key (lower left), a backspace key (upper right), and an enter key (lower right). The 45 GUI buttons 111 are arranged in five rows in the Y direction and 11 columns in the X direction. The rows extend in the X direction, and the columns extend in the Y direction. Note that the GUI buttons 111 are not limited to buttons for alphabets and numbers and so forth for the numeric keypad and may also be buttons for characters of another language, symbols, or the like.

<Electrostatic Sensor 120>

The electrostatic sensor 120 is arranged on the display device 110 so as to overlie the display device 110. As illustrated in FIG. 3, the electrostatic sensor 120 has a plurality of sensor electrodes 121X extending in the X direction and a plurality of sensor electrodes 121Y extending in the Y direction. The sensor electrodes 121X and 121Y are an example of electrodes of the detection unit and are connected to the control device 130 using wiring lines 122X and 122Y. The electrostatic sensor 120 may be, in an example, an electrostatic sensor having the sensor electrodes 121X and 121Y and the wiring lines 122X and 122Y formed by patterning a sheet of a transparent conducting material such as indium tin oxide (ITO) formed on the surface of a transparent substrate of glass. A capacitance detected by the electrostatic sensor 120 is input to the control device 130. A capacitance detected by the electrostatic sensor 120 is an example of a detection result from the electrostatic sensor 120.

FIG. 3 illustrates, in an example, the plurality of sensor electrodes 121X and the plurality of sensor electrodes 121Y.

The spaces between the sensor electrodes 121X and the spaces between the sensor electrodes 121Y are narrower than the spaces between the GUI buttons 111.

The plurality of sensor electrodes 121X are scanned row by row, the plurality of sensor electrodes 121Y are scanned column by column, and an analog-to-digital (AD) converter 132 converts, into digital values, capacitances at a plurality of intersection points of the plurality of sensor electrodes 121X and the plurality of sensor electrodes 121Y. A counter 133 counts the amounts of change in outputs from the AD converter 132 and outputs difference values AAD for the respective intersection points. Note that the resolution can be made higher than that obtained by the spaces between the sensor electrodes 121X or the spaces between the sensor electrodes 121Y by using an interpolation method. In this case, the spaces between the sensor electrodes 121X and the spaces between the sensor electrodes 121Y may be wider than the spaces between the GUI buttons 111. Moreover, although illustration is omitted, in a case where an interpolation method is used, an embodiment is acceptable in which the GUI buttons 111 correspond on a one-to-one basis to sensor electrodes that are as large as the GUI buttons 111.

The position of a fingertip detected on the XY coordinates by the input device 100 using the electrostatic sensor 120 corresponds to, in an example, XY coordinates having the highest capacitance in a region where a fingertip FT is present. The position of a fingertip detected in the Z direction by the input device 100 using the electrostatic sensor 120 has a value that is inversely proportional to a capacitance detected by the electrostatic sensor 120. Thus, the meaning of determination of the position of the fingertip in the Z direction is equivalent to acquisition of a capacitance between the fingertip FT and the electrostatic sensor 120. The input device 100 determines the position of the fingertip FT in the Z direction using the capacitance between the fingertip FT and the electrostatic sensor 120 in an example; however, in the following, in a case where use of the position of the fingertip FT in the Z direction in description facilitates understanding, description will be made using the position of the fingertip FT in the Z direction.

<Control Device 130>

The control device 130 is realized by a computer that includes a central processing unit (CPU), a random access memory (RAM), a read-only memory (ROM), an input-output interface, and an internal bus.

The control device 130 has a main controller 131, the AD converter 132, the counter 133, a determination unit 134, an operation controller 135, a display controller 136, and a memory 137. The main controller 131, the AD converter 132, the counter 133, the determination unit 134, the operation controller 135, and the display controller 136 are illustrated as functional blocks of functions of a program that the control device 130 executes. The memory 137 is a block functionally illustrating a memory of the control device 130.

The main controller 131 is a processing unit that controls processing performed by the control device 130 and performs processing other than processing performed by the AD converter 132, the counter 133, the determination unit 134, the operation controller 135, and the display controller 136. For example, the main controller 131 scans the plurality of sensor electrodes 121X and the plurality of sensor electrodes 121Y.

The AD converter 132 converts outputs from the electrostatic sensor 120 into digital values. Outputs from the AD converter 132 are detection values of capacitances at the individual intersection points of the sensor electrodes 121X and 121Y of the electrostatic sensor 120. The counter 133 counts and outputs a difference value of an output of the AD converter 132 with respect to a reference value. The difference value is a count value of the amount of change of the output with respect to the reference value. In the following, a difference value AAD will be used. Reference values are capacitances at the individual intersection points of the sensor electrodes 121X and 121Y in a case where a finger is not present near the sensor electrodes 121X and 121Y. For each of the intersection points of the sensor electrodes 121X and 121Y, a difference value AAD is a capacitance between the intersection point and a finger.

Difference values AAD are obtained for the individual intersection points. The AD converter 132 converts capacitances at the individual intersection points of the sensor electrodes 121X and 121Y into digital values. The counter 133 counts, for each intersection point, the amount of change of an output from the AD converter 132 with respect to the reference value and outputs a difference value AAD for the intersection point.

The determination unit 134 determines, on the basis of the difference values AAD output from the counter 133, the position of a fingertip on the XY coordinates and the position of the fingertip in the Z direction from the operation surface 105A. The determination unit 134 determines a relative state between the fingertip and the operation surface 105A using a proximity capacitance threshold TH1, a selection capacitance threshold TH2, a confirmation capacitance threshold TH3, and a contact capacitance threshold TH4, a proximity time threshold T1, a selection time threshold T2, a confirmation time threshold T3, and a contact time threshold T4, which will be described later. Examples of the relative state between the fingertip and the operation surface 105A include a non-detection state, a proximity state, a selection state, a confirmation state, and a contact state. These states will be described later.

The operation controller 135 controls the operation of the input device 100 on the basis of the fingertip position determined by the determination unit 134. The display controller 136 controls, on the basis of the fingertip position determined by the determination unit 134, a display on the display device 110. The memory 137 stores programs, data, and the like to be used when the main controller 131, the determination unit 134, the operation controller 135, and the display controller 136 perform processing. Moreover, the memory 137 stores data representing the number of rows and the number of columns of the sensor electrodes 121X and 121Y.

<Capacitance Thresholds and Display on Display Device 110>

FIGS. 4A to 4D are diagrams for describing operations of the input device 100 in time series when the input device 100 is operated. In the upper portions of FIGS. 4A to 4D, the position of a fingertip FT of a hand 10 with respect to the operation surface 105A, a section of the display device 110 and the electrostatic sensor 120, the proximity capacitance threshold TH1, the selection capacitance threshold TH2, the confirmation capacitance threshold TH3, and the contact capacitance threshold TH4 are illustrated. In the lower portions of FIGS. 4A to 4D, the operation surface 105A, nine GUI buttons 111 for alphabets A to C, F to H, and K to M, a selection circle 111A, the position of the fingertip FT, a cursor 112, and an annular indicator 113 are illustrated.

The position of the fingertip FT is indicated by a symbol obtained by combining a cross and a circle (hereinafter referred to as a cross-shaped symbol). The position of the fingertip FT corresponds to a position on the operation surface 105A, the position being determined by mapping the position of the fingertip FT straight from the +Z direction side onto the operation surface 105A. The intersection point of the cross-shaped symbol represents the position of the fingertip FT detected on the XY coordinates by the control device 130 on the basis of outputs from the electrostatic sensor 120. XY coordinates representing the position of the fingertip FT are, in an example, XY coordinates at which the capacitance is highest within the region where the fingertip FT is present. In order to eliminate the effect of noise, in an example, a vertex of a parabola obtained by performing an approximation using the least squares method from the distribution of capacitances for the X axis is used as an X coordinate, and a vertex of a parabola obtained by performing an approximation using the least squares method from the distribution of capacitances for the Y axis is used as a Y coordinate. The position of the fingertip FT determined in this manner is an example of the center position of the finger. In the following, description will be made assuming that the position of the intersection point of the cross-shaped symbol is the position of the fingertip FT on the XY coordinates.

In this case, in an example, the position of the fingertip FT is inside the "G" GUI button 111 on the XY coordinates, and thus the "G" GUI button 111 is selected. The fingertip FT is sufficiently close to the operation surface 105A such that the "G" GUI button 111 can be selected, and a capacitance detected by the electrostatic sensor 120 exceeds the selection capacitance threshold TH2.

The selection circle 111A is displayed in the entirety of the inside of the selected GUI button 111. In FIG. 4A, the selection circle 111A is illustrated in dark gray. The selection circle 111A is an example of a selection image. The selection circle 111A is displayed in a noticeable manner to cause the selected GUI button 111 to stand out (to be emphasized) such that the selected GUI button 111 can be visually distinguished from unselected GUI buttons 111. In an example, the selection circle 111A is displayed so as to overlap the entire GUI button 111.

In this case, the GUI buttons 111 are circular, and thus the selection circle 111A is also circular. In a case where the GUI buttons 111 have shapes other than circles, a shape that is substantially the same as a selected GUI button 111 may be used instead of the selection circle 111A to display the selected GUI button 111 in an exaggerated manner. Part of a selected GUI button 111 may be displayed in an exaggerated manner instead of using the selection circle 111A. Moreover, instead of displaying the selection circle 111A, a selected GUI button 111 may be caused to stand out by causing the selected GUI button 111 to blink, for example.

The cursor 112 is circular. The size of the cursor 112 is proportional to the distance between the fingertip FT and the operation surface 105A. In other words, the size of the cursor 112 is inversely proportional to the magnitude of the capacitance detected by the electrostatic sensor 120. However, the following description will be made assuming that the position of the fingertip FT with respect to the operation surface 105A in the Z direction is maintained in a state where the fingertip FT is sufficiently close to the operation surface 105A such that the "G" GUI button 111 can be selected.

In FIG. 4A, the "G" GUI button 111 is selected and illustrated in dark gray since the selection circle 111A is displayed so as to overlap the "G" GUI button 111. The cursor 112, which is illustrated in light gray, surrounds the "G" GUI button 111. In an example, the GUI buttons 111 are transparent, and the selection circle 111A is translucent. The image of the GUI button 111 is displayed in front of the image of the selection circle 111A. Moreover, the image of the selection circle 111A is displayed in front of the image of the cursor 112.

The image of the GUI button 111 being displayed in front of the image of the selection circle 111A refers to the image of the GUI button 111 being displayed on the image of the selection circle 111A in an overlapping manner. The front side is closer to the side where a display on the display device 110 is visually recognized. In other words, the image of the selection circle 111A is displayed on the rear side of the image of the GUI button 111. The rear side is the opposite side from the front side and is the depth side of a display.

The selection circle 111A being displayed on the front side with respect to the cursor 112 refers to the selection circle 111A being displayed on the cursor 112 in a region where the selection circle 111A and the cursor 112 overlap. In other words, the cursor 112 is not displayed on the selection circle 111A in the region where the selection circle 111A and the cursor 112 overlap.

The "H" GUI button 111 is illustrated using an open circle since the "H" GUI button 111 is in an unselected state, and part of the "H" GUI button 111 that overlaps the cursor 112 is displayed on the rear side of the cursor 112. Thus, the image of the selected GUI button 111, the image of the selection circle 111A, the image of the cursor 112, and the images of the unselected GUI buttons 111 are displayed in this order from the front side to the rear side.

Note that color display is actually possible, and thus it is sufficient that, for example, the selection circle 111A be displayed in a conspicuous color such as yellow, the cursor 112 be displayed in a color, such as blue, that is less conspicuous than that of the selection circle 111A, and the unselected GUI buttons 111 be displayed in a color, such as white or light gray, with which it is easy to identify boundaries between the GUI buttons 111 and portions other than the GUI buttons 111. The images of the GUI buttons 111 are transparent, and thus the color of the selection circle 111A on the rear side passes through the selected GUI button 111, so that the selected GUI button 111 is displayed in the color of the selection circle 111A.

<Proximity Capacitance Threshold TH1, Selection Capacitance Threshold TH2, Confirmation Capacitance Threshold TH3, and Contact Capacitance Threshold TH4>

When determining the relative state between the fingertip FT and the operation surface 105A, the input device 100 uses a plurality of capacitance thresholds, which are the proximity capacitance threshold TH1, the selection capacitance threshold TH2, the confirmation capacitance threshold TH3, and the contact capacitance threshold TH4.

The proximity capacitance threshold TH1, the selection capacitance threshold TH2, the confirmation capacitance threshold TH3, and the contact capacitance threshold TH4 are thresholds used when the control device 130 determines the position of the fingertip FT with respect to the operation surface 105A on the basis of a capacitance from the electrostatic sensor 120. In FIGS. 4A to 4D, the proximity capacitance threshold TH1, the selection capacitance threshold TH2, the confirmation capacitance threshold TH3, and the contact capacitance threshold TH4 are illustrated at positions based on distances from the operation surface 105A in accordance with capacitances corresponding to the proximity capacitance threshold TH1, the selection capacitance threshold TH2, the confirmation capacitance threshold TH3, and the contact capacitance threshold TH4 such that the proximity capacitance threshold TH1, the selection capacitance threshold TH2, the confirmation capacitance threshold TH3, and the contact capacitance threshold TH4 can be visually recognized.

The contact capacitance threshold TH4 represents a higher capacitance than the confirmation capacitance threshold TH3, and thus a broken line corresponding to the contact capacitance threshold TH4 is closer to the operation surface 105A than a broken line corresponding to the confirmation capacitance threshold TH3 is. The confirmation capacitance threshold TH3 represents a higher capacitance than the selection capacitance threshold TH2, and thus the broken line corresponding to the confirmation capacitance threshold TH3 is closer to the operation surface 105A than a broken line corresponding to the selection capacitance threshold TH2 is. The selection capacitance threshold TH2 represents a higher capacitance than the proximity capacitance threshold TH1, and thus the broken line corresponding to the selection capacitance threshold TH2 is closer to the operation surface 105A than a broken line corresponding to the proximity capacitance threshold TH1 is.

The proximity capacitance threshold TH1 is used to determine whether or not the fingertip FT is close to the operation surface 105A. The selection capacitance threshold TH2 is used to determine whether or not a GUI button 111 among the GUI buttons 111 is selected in response to a hovering input. The confirmation capacitance threshold TH3 is used to determine whether or not it is acceptable to confirm selection of the selected GUI button 111 in response to a hovering input. The contact capacitance threshold TH4 is used to determine whether or not the fingertip FT is in contact with the operation surface 105A through a touch input.

In the following, the position of the broken line corresponding to the proximity capacitance threshold TH1 from the operation surface 105A in a direction perpendicular to the operation surface 105A is referred to as the position of the proximity capacitance threshold TH1. The position of the broken line corresponding to the selection capacitance threshold TH2 from the operation surface 105A in the direction perpendicular to the operation surface 105A is referred to as the position of the selection capacitance threshold TH2. The position of the broken line corresponding to the confirmation capacitance threshold TH3 from the operation surface 105A in the direction perpendicular to the operation surface 105A is referred to as the position of the confirmation capacitance threshold TH3. The position of the broken line corresponding to the contact capacitance threshold TH4 from the operation surface 105A in the direction perpendicular to the operation surface 105A is referred to as the position of the contact capacitance threshold TH4. The position of the contact capacitance threshold TH4 is the position of the operation surface 105A in the Z direction.

<Proximity Time Threshold T1, Selection Time Threshold T2, Confirmation Time Threshold T3, and Contact Time Threshold T4 and Relative States>

When determining the relative state between the fingertip FT and the operation surface 105A, the determination unit 134 of the control device 130 of the input device 100 uses a plurality of time thresholds, which are the proximity time threshold T1, the selection time threshold T2, the confirmation time threshold T3, and the contact time threshold T4, in addition to the proximity capacitance threshold TH1, the selection capacitance threshold TH2, the confirmation capacitance threshold TH3, and the contact capacitance threshold TH4. Examples of the relative state include the non-detection state, the proximity state, the selection state, the confirmation state, and the contact state. The proximity state, the selection state, the confirmation state, and the contact state are an example of a plurality of states other than the non-detection state. As the relative state changes from the contact state, to the confirmation state, to the selection state, to the proximity state, and then to the non-detection state, the position of the fingertip FT moves farther away from the operation surface 105A. In the contact state, the confirmation state, the selection state, the proximity state, and the non-detection state, the positions of the fingertip FT from the operation surface 105A in the Z direction are positions corresponding to the contact state, the confirmation state, the selection state, the proximity state, and the non-detection state in a respective manner. Each of the positions of the fingertip FT from the operation surface 105A in the Z direction is positioned in a corresponding one of a plurality of sensing layers segmented in accordance with the distance from the operation surface 105A in the Z direction.

The plurality of time thresholds are used to prevent, as described above, an operation method from being erroneously determined when sudden noise occurs, for example. Note that the plurality of time thresholds are used to eliminate the effect of noise, and thus the proximity time threshold T1, the selection time threshold T2, the confirmation time threshold T3, and the contact time threshold T4 are all set to the same time in an example. The time set as the proximity time threshold T1, the selection time threshold T2, the confirmation time threshold T3, and the contact time threshold T4 is a time corresponding to three cycles of the control cycle of the control device 130 in an example. The control cycle is 50 ms in an example, and thus the time is a significantly short time (150 ms).

The determination unit 134 measures a time during which a capacitance detected by the electrostatic sensor 120 is greater than or equal to the contact capacitance threshold TH4. In a case where the time continues for the contact time threshold T4 or longer, the determination unit 134 determines that the relative state is the contact state.

In a case where the relative state is not the contact state, the determination unit 134 measures a time during which a capacitance detected by the electrostatic sensor 120 is greater than or equal to the confirmation capacitance threshold TH3. In a case where the time continues for the confirmation time threshold T3 or longer, the determination unit 134 determines that the relative state is the confirmation state.

In a case where the relative state is not the contact state or the confirmation state, the determination unit 134 measures a time during which a capacitance detected by the electrostatic sensor 120 is greater than or equal to the selection capacitance threshold TH2. In a case where the time continues for the selection time threshold T2 or longer, the determination unit 134 determines that the relative state is the selection state.

In a case where the relative state is not the contact state, the confirmation state, or the selection state, the determination unit 134 measures a time during which a capacitance detected by the electrostatic sensor 120 is greater than or equal to the proximity capacitance threshold TH1. In a case where the time continues for the proximity time threshold T1 or longer, the determination unit 134 determines that the relative state is the proximity state.

In a case where the relative state is not any of the contact state, the confirmation state, the selection state, and the proximity state, the determination unit 134 determines that the relative state is the non-detection state, in which a fingertip is not detected. Note that the plurality of capacitance thresholds increase in the order of the proximity capacitance threshold TH1, the selection capacitance threshold TH2, the confirmation capacitance threshold TH3, and the contact capacitance threshold TH4, and thus in a case where the determination unit 134 determines that the relative state is not the proximity state, the relative state is not the contact state, the confirmation state, or the selection state. In a case where the determination unit 134 determines that the relative state is not the proximity state or the contact state, the relative state is not the confirmation state or the selection state. In a case where the determination unit 134 determines that the relative state is not the proximity state, the contact state, or the confirmation state, the relative state is not the selection state.

<Operations of Input Device 100 in Individual Relative States>

When the fingertip FT is farther from the operation surface 105A than the position of the proximity capacitance threshold TH1 is, the relative state between the fingertip FT and the operation surface 105A is the non-detection state, and the capacitances detected by the electrostatic sensor 120 at all of the intersection points are less than the proximity capacitance threshold TH1. In the non-detection state, the input device 100 is in the standby state, and the display device 110 displays the standby image (see FIG. 2).

When the fingertip FT approaches the operation surface 105A and reaches the position of the proximity capacitance threshold TH1, the capacitance at the intersection point closest to the fingertip FT becomes equal to the proximity capacitance threshold TH1. Note that the position of the proximity capacitance threshold TH1 is about 5 cm from the operation surface 105A in an example.

When the state in which a capacitance detected by the electrostatic sensor 120 is greater than or equal to the proximity capacitance threshold TH1 continues for the proximity time threshold T1 or longer, the input device 100 switches to the operation state, and the display device 110 displays the input image (see FIG. 1).

When the fingertip FT is farther from the operation surface 105A than the position of the selection capacitance threshold TH2 is, the capacitances at all the intersection points of the electrostatic sensor 120 are less than the selection capacitance threshold TH2. When the fingertip FT approaches the operation surface 105A and reaches the position of the selection capacitance threshold TH2, the capacitance at the intersection point closest to the fingertip FT becomes equal to the selection capacitance threshold TH2. When the fingertip FT becomes closer to the operation surface 105A than the position of the selection capacitance threshold TH2 is, the capacitance at the intersection point closest to the fingertip FT becomes higher than the selection capacitance threshold TH2. Note that the position of the selection capacitance threshold TH2 is about 3 cm from the operation surface 105A in an example.

When a state where the fingertip FT approaches the operation surface 105A in order to operate any one of the GUI buttons 111, and a capacitance detected by the electrostatic sensor 120 is greater than or equal to the selection capacitance threshold TH2 continues for the selection time threshold T2 or longer, a GUI button 111 including the position of the fingertip FT among the GUI buttons 111 is selected, the selection circle 111A is displayed inside the selected GUI button 111, and the cursor 112 is displayed so as to surround the selected GUI button 111. The diameter of the cursor 112 is inversely proportional to the magnitude of the capacitance. Thus, when the fingertip FT approaches the operation surface 105A, the cursor 112 becomes smaller. As a result, the user can visually recognize that their fingertip FT is approaching the operation surface 105A.

Note that when the fingertip FT approaches the operation surface 105A and reaches the position of the selection capacitance threshold TH2, in a case where there is not a GUI button 111 including the position of the fingertip FT, none of the GUI buttons 111 is selected, and the cursor 112 is displayed so as to be centered around the position of the fingertip FT. The diameter of the cursor 112 is inversely proportional to the magnitude of the capacitance.

The same or similar applies to the confirmation capacitance threshold TH3. When the fingertip FT is farther from the operation surface 105A than the position of the confirmation capacitance threshold TH3 is, the capacitances at all the intersection points are less than the confirmation capacitance threshold TH3. When the fingertip FT approaches the operation surface 105A and reaches the position of the confirmation capacitance threshold TH3, the capacitance at the intersection point closest to the fingertip FT becomes equal to the confirmation capacitance threshold TH3. When the fingertip FT becomes closer to the operation surface 105A than the position of the confirmation capacitance threshold TH3 is, the capacitance at the intersection point closest to the fingertip FT becomes higher than the confirmation capacitance threshold TH3. Note that the position of the confirmation capacitance threshold TH3 is about 2 cm from the operation surface 105A in an example.

In a state where any one of the GUI buttons 111 is selected, when a state where a capacitance detected by the electrostatic sensor 120 is greater than or equal to the confirmation capacitance threshold TH3 continues for the confirmation time threshold T3 or longer, the GUI button 111 shifts to a state where the confirmation operation for confirming an input to the selected GUI button 111 is in progress. In the state where the confirmation operation is in progress, the cursor 112 becomes equal in size to the GUI button 111 and is hidden behind the GUI button 111 so as to be hidden from view, and the annular indicator 113 is displayed. When the period during which the confirmation operation is in progress becomes the confirmation time threshold T3 or longer, the annular indicator 113 is hidden from view, the GUI button 111 is displayed in a concave manner, and the input to the selected GUI button 111 is confirmed. Since the annular indicator 113 is hidden from view, and the GUI button 111 is displayed in a concave manner, the user can visually recognize that the input has been confirmed.

The same or similar applies to the contact capacitance threshold TH4. When the fingertip FT is farther from the operation surface 105A than the position of the contact capacitance threshold TH4 is, the capacitances at all the intersection points are less than the contact capacitance threshold TH4. When the fingertip FT approaches the operation surface 105A and reaches the position of the contact capacitance threshold TH4 (the operation surface 105A), the capacitance at the intersection point closest to the fingertip FT becomes equal to the contact capacitance threshold TH4. When the contact area between the finger and the operation surface 105A increases, the capacitance at the intersection point closest to the fingertip FT becomes higher than the contact capacitance threshold TH4.

When the fingertip FT is in the display region of any of the GUI buttons 111, the GUI button 111 enters its selected state and a state where the contact operation for the selected GUI button 111 is in progress. In the state where the contact operation is in progress, the cursor 112 becomes equal in size to the GUI button 111 and is hidden behind the GUI button 111 so as to be hidden from view, and the annular indicator 113 is displayed.

When a state where a capacitance detected by the electrostatic sensor 120 is greater than or equal to the contact capacitance threshold TH4 continues for the contact time threshold T4 or longer, the annular indicator 113 is hidden from view, the selected GUI button 111 is displayed in a concave manner, and the input to the selected GUI button 111 is confirmed. Since the annular indicator 113 is hidden from view, and the GUI button 111 is displayed in a concave manner, the user can visually recognize that the input has been confirmed.

<Annular Indicator 113>

The annular indicator 113 is an indicator having an annular shape, the indicator being displayed along the outer edge of the selected GUI button 111 and in front of GUI button 111 in an overlapping manner. The annular indicator 113 begins to be drawn when the position of the fingertip FT reaches, through a hovering input, the position of the confirmation capacitance threshold TH3 or the position of the contact capacitance threshold TH4. When the position of the fingertip FT reaches the position of the confirmation capacitance threshold TH3, the GUI button 111 enters a state where the confirmation operation for confirming selection of the GUI button 111 is in progress. When the position of the fingertip FT reaches the position of the contact capacitance threshold TH4, the GUI button 111 enters a state where the contact operation for confirming selection of the GUI button 111 is in progress. Note that, in this case, the cursor 112 becomes equal in size to the GUI button 111 and is hidden behind the GUI button 111, so that the cursor 112 stops being displayed.

The annular indicator 113 represents the elapsed time (a duration) from the start of the confirmation operation or the contact operation and the remaining time to completion of the confirmation operation or the contact operation.

The annular indicator 113 extends along an annular shape clockwise from the 12 o'clock direction (the uppermost portion) in a plan view while the confirmation operation or the contact operation is in progress. When the confirmation operation or the contact operation is confirmed, the annular indicator 113 forms the annular shape.

<Description of Operations Illustrated in FIGS. 4A to 4D>

In FIG. 4A, the fingertip FT has reached the position of the selection capacitance threshold TH2 in the Z direction. The position of the fingertip FT on the XY coordinates is within the "G" GUI button 111, and thus the selection circle 111A is displayed so as to overlap the "G" GUI button 111. In this case, the cursor 112 is displayed so as to surround the selection circle 111A. In the selection state illustrated in FIG. 4A, an input is not confirmed. Since the selection state is provided, input can be performed by moving the fingertip FT slowly.

Figure 4B:
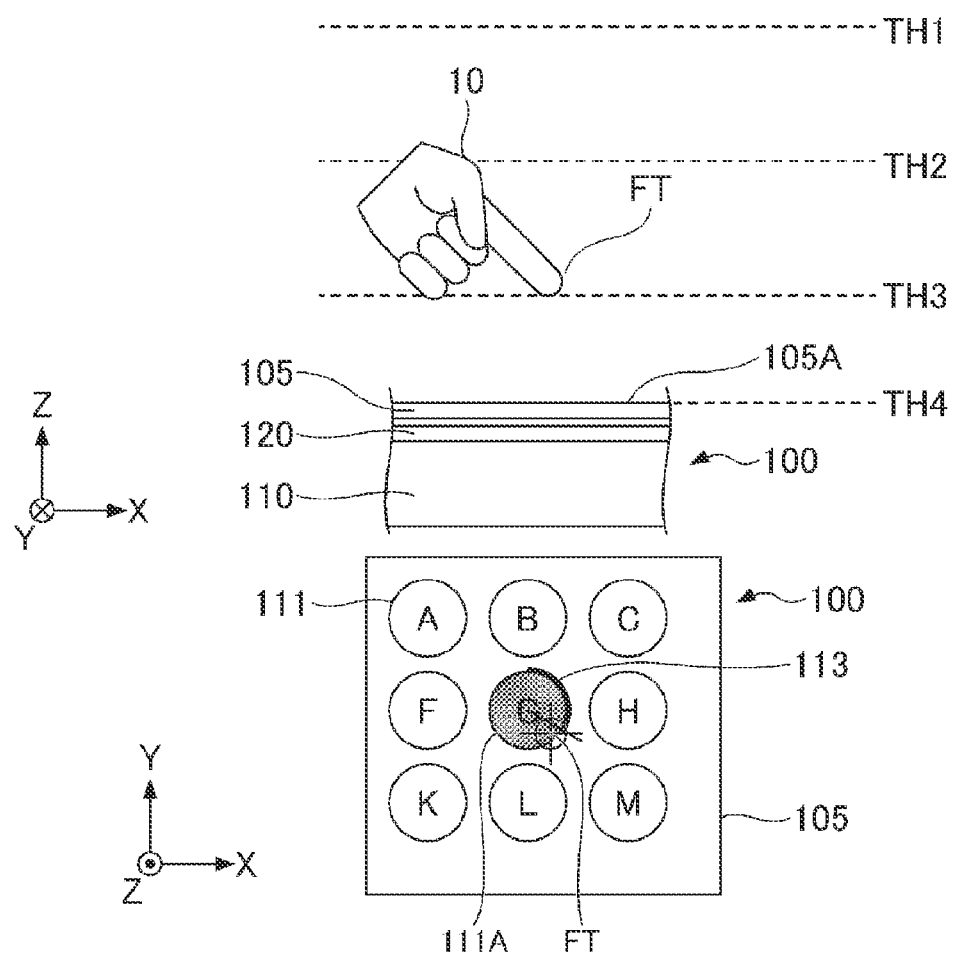
FIG. 4B is a diagram for describing the operations of the input device in time series when the input device is operated.

In FIG. 4B, the fingertip FT has approached the operation surface 105A from the state illustrated in FIG. 4A, and the position of the fingertip FT has reached the confirmation capacitance threshold TH3 in the Z direction. At the point in time when the position of the fingertip FT reaches the confirmation capacitance threshold TH3 in the Z direction, the cursor 112 (see FIG. 4A) is hidden from view. Moreover, since the confirmation operation is in progress, the annular indicator 113 has started to be drawn. Since the cursor 112 is displayed in the selection state, and the annular indicator 113 is displayed in the confirmation state, what is displayed in the selection state is different from what is displayed in the confirmation state. As a result, an unintentional input can be prevented. Moreover, the angle of the annular indicator 113 is gradually increased in the confirmation state, so that the user can easily understand that the input will be confirmed when the user stops moving their fingertip FT.

Figure 4C:
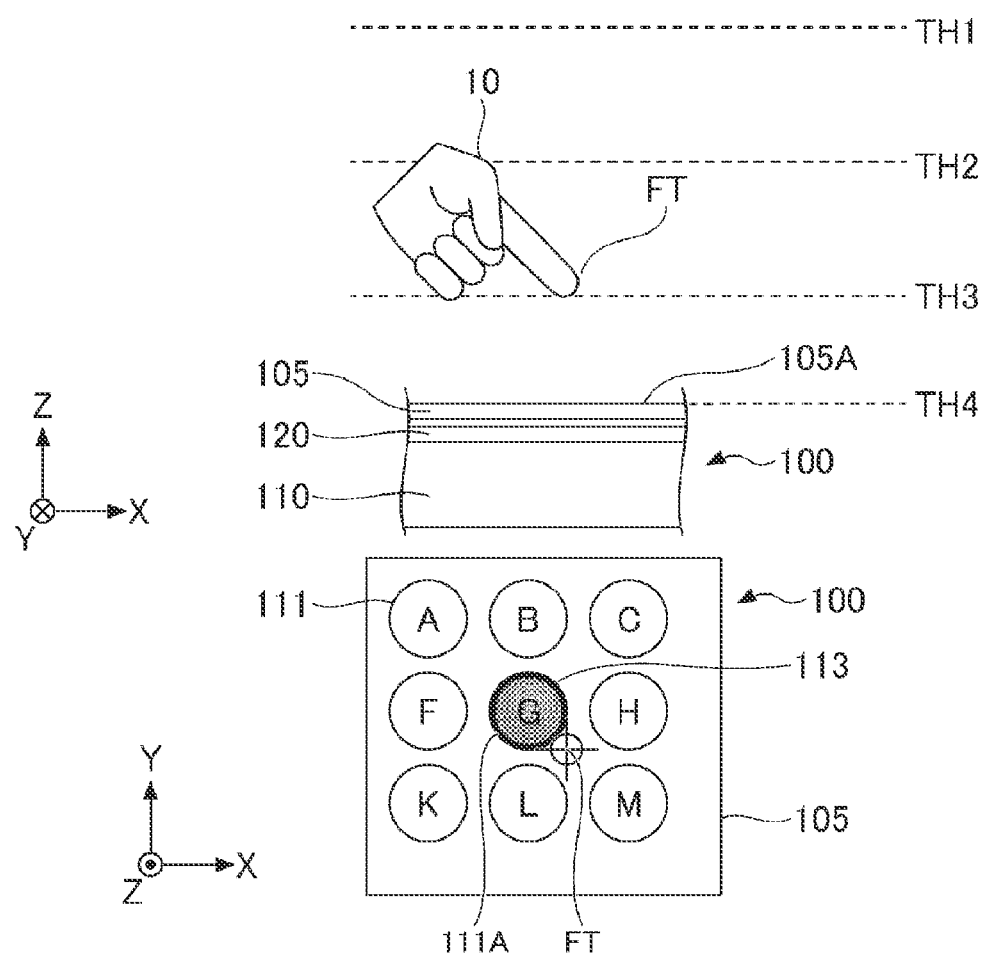
FIG. 4C is a diagram for describing the operations of the input device in time series when the input device is operated.

In FIG. 4C, the confirmation operation is continuously performed from the state illustrated in FIG. 4B. FIG. 4C illustrates a state immediately before the annular indicator 113 completes almost one circle.

Figure 4D:
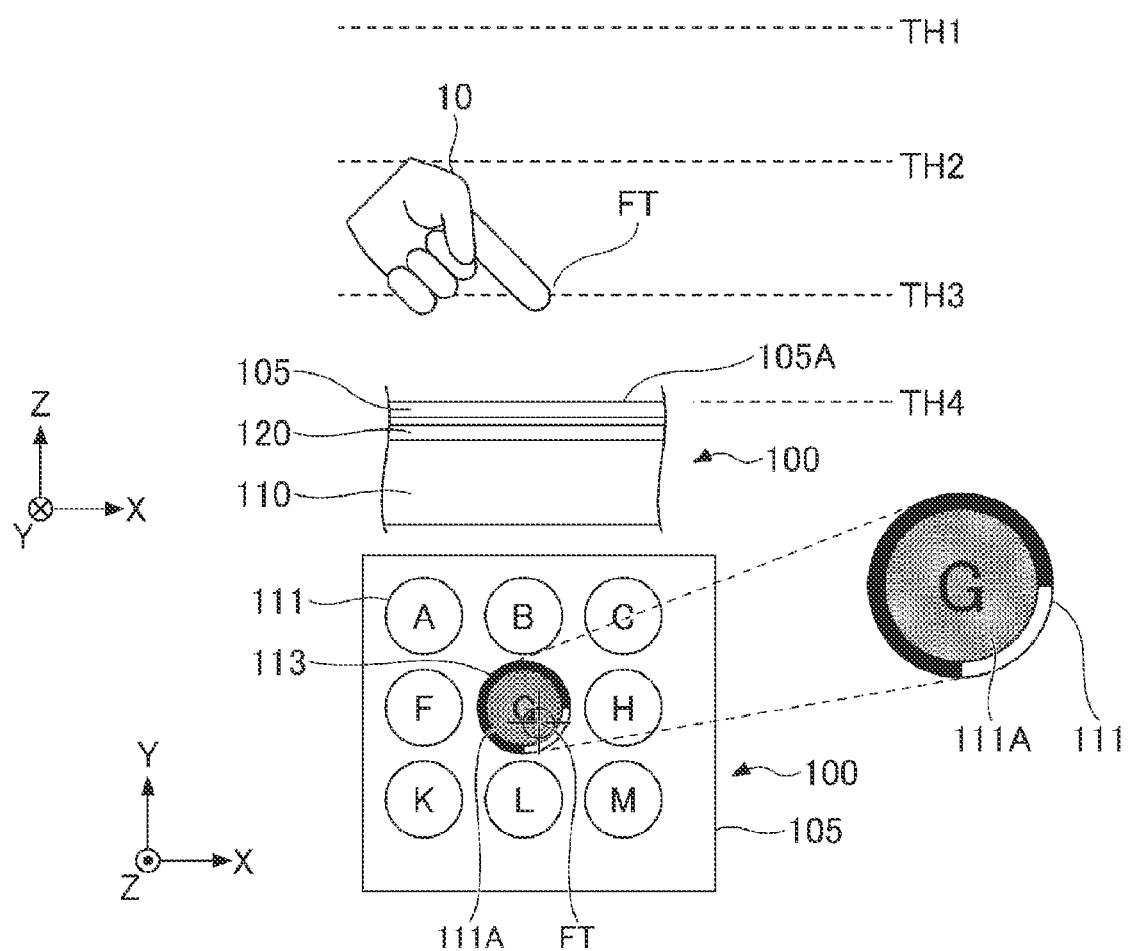
FIG. 4D is a diagram for describing the operations of the input device in time series when the input device is operated.

FIG. 4D illustrates a state immediately after the state illustrated in FIG. 4C. In the state illustrated in FIG. 4D, after the state where a capacitance detected by the electrostatic sensor 120 is greater than or equal to the confirmation capacitance threshold TH3 continues for the confirmation time threshold T3 or longer, the annular indicator 113 completes almost one circle, the selection circle 111A that is displayed so as to overlap the "G" GUI button 111 is changed to an concave image, and the input is confirmed. Although the state where the annular indicator 113 has completed almost one circle is not illustrated in FIG. 4D, when the annular indicator 113 completes almost one circle, the image of the selection circle 111A displayed so as to overlap the "G" GUI button 111 is switched to a concave image as illustrated in FIG. 4D in order to represent that the input is confirmed. The concave image represents a state where the GUI button 111 is pressed down to the depth side and is deformed.

The state where the GUI button 111 is concave is illustrated in an example by drawing a state where the GUI button 111 is irradiated with light from the +Y direction side and the −X direction side, a shadow of the concave GUI button 111 is casted on the +Y direction side and the −X direction side of the concave GUI button 111, and the −Y direction side and the +X direction side of the concave GUI button 111 are exposed to light.

<Entire Display on Input Device 100>

FIG. 5 is a diagram illustrating the input device 100 that is in a state where a hovering input to the selected GUI button 111 is confirmed. FIG. 5 illustrates a state where a hovering input to the "G" GUI button 111 is confirmed. Compared with the state illustrated in FIG. 1, in FIG. 5, the image of the selection circle 111A displayed so as to overlap the "G" GUI button 111 is switched to an image that is in a concave state, and the input content display unit 115 displays an alphabet "G". FIG. 5 illustrates the "G" GUI button 111 in an enlarged manner. Among the 45 GUI buttons 111 displayed on the display device 110 of the input device 100, only the "G" GUI button 111 has an image that is in an concave state, so that the user can visually recognize that input of the "G" GUI button 111 has been confirmed.

<Flow Chart>

Figure 6:
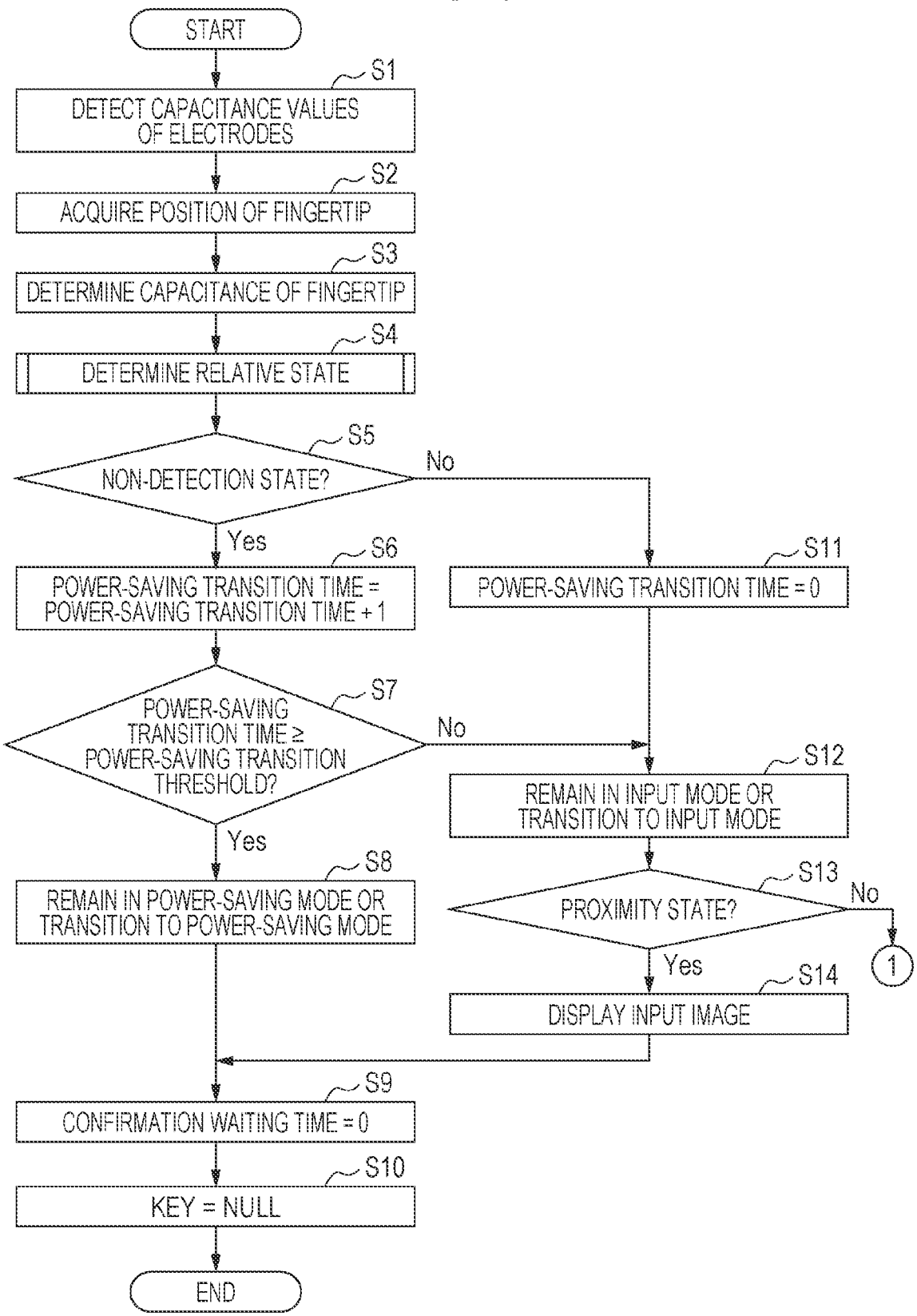
FIG. 6 is a diagram illustrating a flow chart representing processing executed by the control device of the input device.
Figure 7:
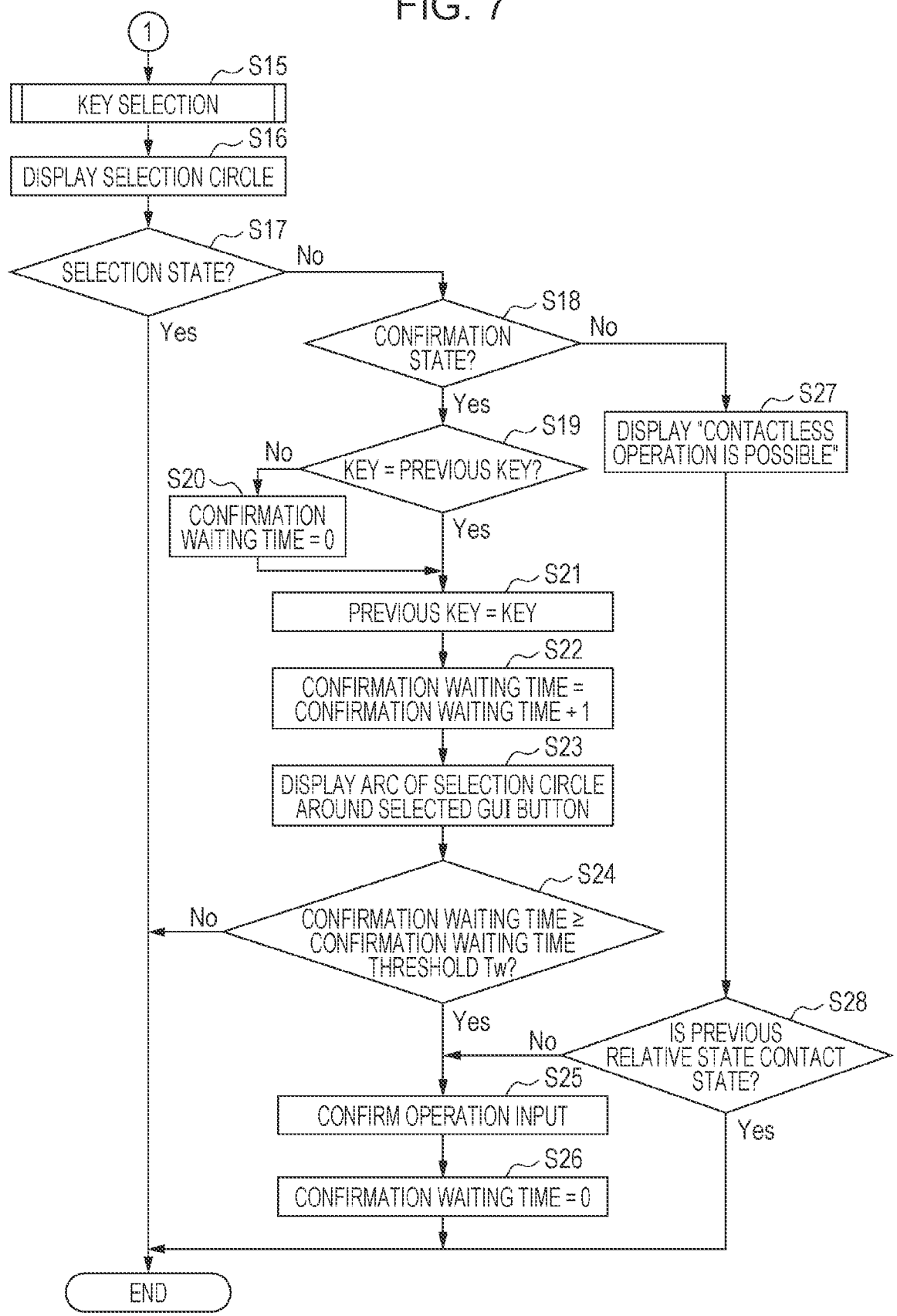
FIG. 7 is a diagram illustrating a flow chart representing processing executed by the control device of the input device.

FIGS. 6 and 7 are diagrams illustrating flow charts representing processing performed by the control device 130 of the input device 100. The procedures illustrated in FIGS. 6 and 7 are invoked and performed by an application software program that is not illustrated. In a case where the application software program is waiting for input, the procedures illustrated in FIGS. 6 and 7 are repeatedly performed from START to END in predetermined control cycles.

When the control device 130 starts processing (Start), the determination unit 134 acquires capacitances of the individual electrodes (the sensor electrodes 121X and 121Y) (Step S1).

The determination unit 134 acquires the position (xf, yf) of the fingertip FT on the XY coordinates (Step S2).

The determination unit 134 determines, using the XY coordinates acquired in Step S2, the capacitance of the fingertip FT (Step S3). The capacitance of the fingertip FT corresponds to the position of the fingertip FT in the Z direction and is a capacitance detected by the electrostatic sensor 120.

The determination unit 134 determines a relative state between the fingertip FT and the operation surface 105A (Step S4). Processing performed in Step S4 is a subroutine process for determining a relative state and will be described later using FIG. 8. By performing processing in Step S4, the relative state between the fingertip FT and the operation surface 105A is determined to be one of the relative states.

The determination unit 134 determines whether or not the relative state between the fingertip FT and the operation surface 105A is the non-detection state (Step S5).

In a case where the determination unit 134 determines that the relative state between the fingertip FT and the operation surface 105A is the non-detection state (S5: Yes), the operation controller 135 increments a counter for a power-saving transition time (Step S6). That is, power-saving transition time=power-saving transition time+1. The power-saving transition time is a time counted to set the input device 100 to be in the standby state.

The operation controller 135 determines whether or not the counter for the power-saving transition time indicates a value greater than or equal to a power-saving transition threshold (Step S7). The power-saving transition threshold is set to, for example, about a few seconds to a few minutes.

In a case where the operation controller 135 determines that the counter for the power-saving transition time indicates a value greater than or equal to the power-saving transition threshold (S7: Yes), the operation controller 135 causes the input device 100 to remain in a power-saving mode (the standby state) or transition to the power-saving mode (the standby state) (Step S8). In the standby state, the display device 110 displays the standby image (see FIG. 2). The input device 100 may switch the CPU to the power-saving mode.

The operation controller 135 sets a counter for a confirmation waiting time to zero (Step S9). That is, confirmation waiting time=0. The confirmation waiting time is a waiting time from when the confirmation operation or the contact operation is started regarding the selected GUI button 111 to when the input is confirmed. When the confirmation waiting time reaches a predetermined time (the confirmation time threshold T3 or the contact time threshold T4), an operation input to the selected GUI button 111 is confirmed. The operation controller 135 includes this counter. The confirmation waiting time is a waiting time from when the confirmation operation is performed to when the operation input is confirmed. When the confirmation waiting time becomes greater than or equal to a confirmation waiting time threshold Tw, the operation input is confirmed in Step S26, which will be described later.

The operation controller 135 sets a selected key (key) to null (Step S10). In this case, the key (key) refers to a key (a GUI button 111) selected through key selection processing in Step S15, which will be described later. "The selected key is null" refers to none of the GUI buttons 111 being selected.

When completing processing in Step S10, the operation controller 135 completes a series of processing operations (END) and causes the process to return to Step S1.

In Step S5, in a case where the determination unit 134 determines that the relative state between the fingertip FT and the operation surface 105A is not the non-detection state (S5: No), the operation controller 135 sets the counter for the power-saving transition time to zero (Step S11). That is, power-saving transition time=0.

The operation controller 135 causes the input device 100 to remain in the input mode or transition to the input mode when the input device 100 is in the power-saving mode (Step S12).

The determination unit 134 determines whether or not the relative state between the fingertip FT and the operation surface 105A is the proximity state (Step S13).

In a case where the determination unit 134 determines that the relative state between the fingertip FT and the operation surface 105A is the proximity state (S13: Yes), the operation controller 135 causes the display controller 136 to display the input image on the display device 110 (Step S14). When processing in Step S14 is complete, the operation controller 135 causes the process to proceed to Step S9.

Moreover, in a case where the determination unit 134 determines in Step S13 that the relative state between the fingertip FT and the operation surface 105A is not the proximity state (S13: No), the key selection processing is performed (Step S15). The process proceeds to Step S15 when the relative state is any one of the selection state, the confirmation state, and the contact state. The key selection processing is processing for selecting a key (a GUI button 111) selected in the selection state, the confirmation state, or the contact state. Processing performed in Step S15 is a subroutine process and will be described later using FIG. 10. By performing processing in Step S15, the selected key (the GUI button 111) is determined.

The operation controller 135 causes the display controller 136 to display the selection circle 111A so as to overlap the key (the GUI button 111) determined in Step S15 (Step S16).

The determination unit 134 determines whether or not the relative state between the fingertip FT and the operation surface 105A is the selection state (Step S17).

In a case where the determination unit 134 determines that the relative state between the fingertip FT and the operation surface 105A is the selection state (S17: Yes), the operation controller 135 completes a series of processing operations (END) and causes the process to return to Step S1.

Moreover, in a case where the determination unit 134 determines in Step S17 that the relative state between the fingertip FT and the operation surface 105A is not the selection state (S17: No), the determination unit 134 determines whether or not the relative state between the fingertip FT and the operation surface 105A is the confirmation state (Step S18).

In a case where it is determined that the relative state between the fingertip FT and the operation surface 105A is the confirmation state (S18: Yes), the operation controller 135 determines whether or not the key (the GUI button 111) selected in Step S15 is the same as the key (the GUI button 111) selected in the previous Step S15 (Step S19). That is, the operation controller 135 determines whether or not key=previous key. This determination is made to determine whether or not the same GUI button 111 is continuously selected and the confirmation operation is in progress.

In a case where the operation controller 135 determines that the key (the GUI button 111) selected in Step S15 is not the same as the key (the GUI button 111) selected in the previous Step S15 (S19: No), the operation controller 135 sets the confirmation waiting time to zero (Step S20). When the operation controller 135 completes processing in Step S20, the operation controller 135 causes the process to proceed to Step S21.

In a case where the operation controller 135 determines in Step S19 that the key (the GUI button 111) selected in Step S15 is the same as the key (the GUI button 111) selected in the previous Step S15 (S19: Yes), the key (the GUI button 111) selected in the previous Step S15 is updated to the key (the GUI button 111) selected in the current Step S15 (Step S21). That is, previous key=key.

The operation controller 135 increments the counter for the confirmation waiting time (Step S22). That is, confirmation waiting time=confirmation waiting time+1.

The operation controller 135 causes the display controller 136 to display, as the annular indicator 113, an arc of a x (confirmation waiting time/predetermined time) [rad] along the circumference of the selection circle 111A, which is displayed so as to overlap the selected "G" GUI button 111 (Step S23).

The operation controller 135 determines whether or not the confirmation waiting time is greater than or equal to the confirmation waiting time threshold Tw (Step S24).

In a case where the operation controller 135 determines that the confirmation waiting time is greater than or equal to the confirmation waiting time threshold Tw (S24: Yes), the operation input to the selected key is confirmed (Step S25). The operation controller 135 reports, to the application software program, the key (the GUI button 111) for which the operation input is confirmed. As a result, the application software program operates in accordance with the reported key.

The operation controller 135 sets the confirmation waiting time to zero (Step S26). That is, confirmation waiting time=0. When completing processing in Step S26, the operation controller 135 completes a series of processing operations (END) and causes the process to return to Step S1.

In a case where the operation controller 135 determines in Step S24 that the confirmation waiting time is not greater than or equal to the confirmation waiting time threshold Tw (S24: No), the operation controller 135 completes a series of processing operations (END) and causes the process to return to Step S1.

Moreover, in a case where the operation controller 135 determines in Step S7 that the counter for the power-saving transition time does not indicate a value greater than or equal to the power-saving transition threshold (S7: No), the operation controller 135 causes the process to proceed to Step S12. This is because the counter value of the power-saving transition time has not reached the power-saving transition threshold.

In a case where the operation controller 135 determines in Step S18 that the relative state between the fingertip FT and the operation surface 105A is not the confirmation state (S18: No), the operation controller 135 sends a message saying "contactless operation is possible" to the display controller 136. The display controller 136 displays the message on the display device 110 (Step S27). In a case where the relative state is not the non-detection state, the proximity state, or the selection state, a determination is made in Step S18. In a case where it is determined in Step S18 that the relative state is not the confirmation state, the relative state is the contact state. The message enables the user to understand that an operation is also possible in a contactless manner.

The determination unit 134 determines whether or not the previous relative state between the fingertip FT and the operation surface 105A is the contact state (Step S28).

In a case where the determination unit 134 determines that the previous relative state between the fingertip FT and the operation surface 105A is not the contact state (S28: No), the operation controller 135 causes the process to proceed to Step S25. As a result, the key (the GUI button 111) confirmed through the contact operation is reported to the application software program, and the application software program operates in accordance with the reported key.

In Step S28, in a case where the determination unit 134 determines that the previous relative state between the fingertip FT and the operation surface 105A is the contact state (S28: Yes), the operation controller 135 completes a series of processing operations (END) and causes the process to return to Step S1.

Immediately after the fingertip FT touches the operation surface 105A, the key input is confirmed. Even when the fingertip FT remains in contact with the operation surface 105A after the key input is confirmed, the key is not input.

<Relative State Determination Processing>

Figure 8:
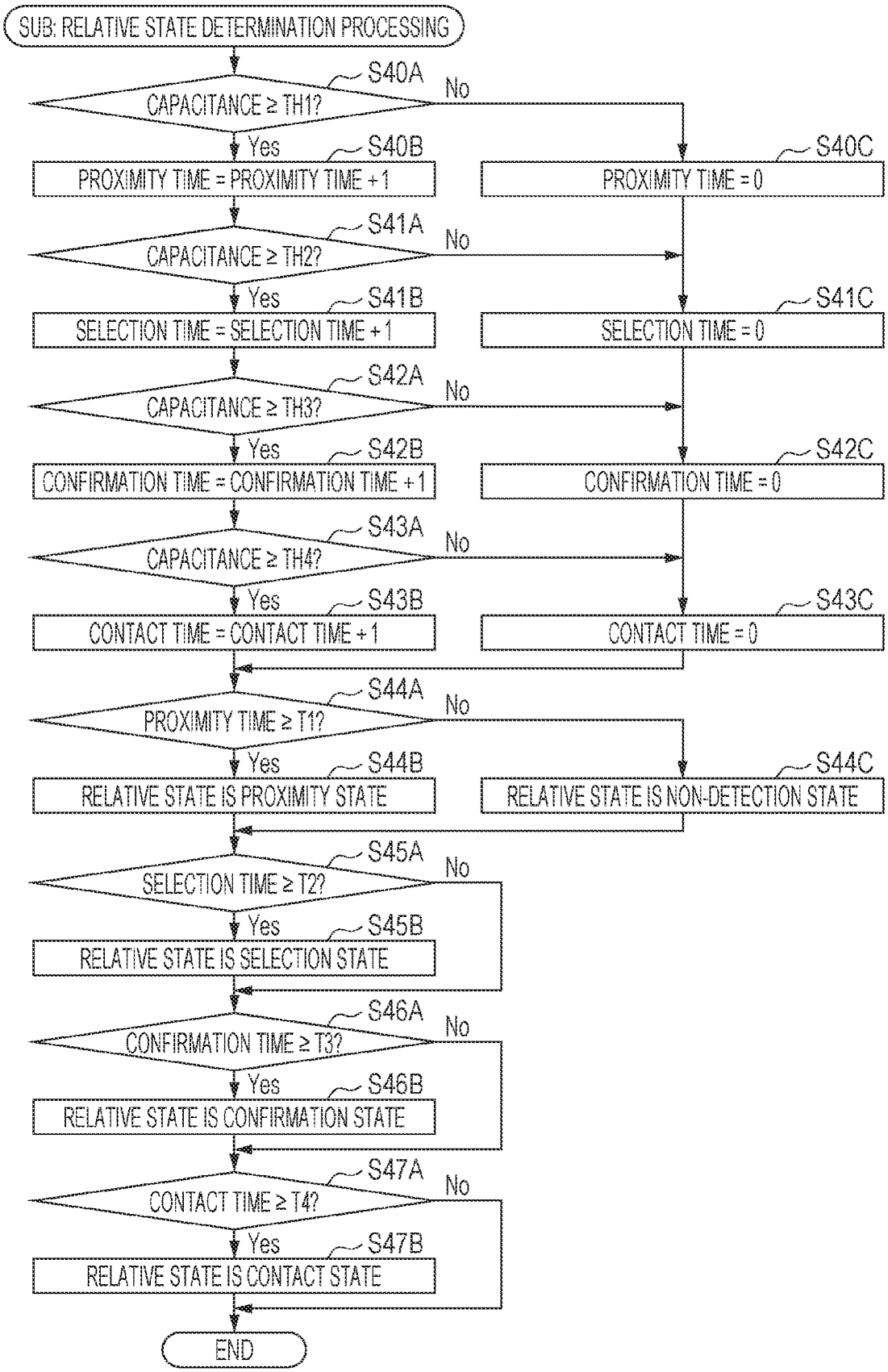
FIG. 8 is a flow chart illustrating relative state determination processing.

FIG. 8 is a flow chart illustrating relative state determination processing. The processing illustrated in FIG. 8 is a subroutine process as Step S4 of FIG. 6.

The determination unit 134 determines whether or not the capacitance of the fingertip FT is greater than or equal to the proximity capacitance threshold TH1 (Step S40A).

In a case where the determination unit 134 determines that the capacitance of the fingertip FT is greater than or equal to the proximity capacitance threshold TH1 (540A: Yes), the determination unit 134 increments a timer for a proximity time (Step S40B). That is, proximity time=proximity time+1. This timer is included in the determination unit 134. When the determination unit 134 completes processing in Step S40B, the determination unit 134 causes the process to proceed to Step S41A.

In a case where the determination unit 134 determines in Step S40A that the capacitance of the fingertip FT is not greater than or equal to the proximity capacitance threshold TH1 (540A: No), the determination unit 134 sets the proximity time to zero (Step S40C). That is, proximity time=0. When the determination unit 134 completes processing in Step S40C, the determination unit 134 causes the process to proceed to Step S41C.

The determination unit 134 determines whether or not the capacitance of the fingertip FT is greater than or equal to the selection capacitance threshold TH2 (Step S41A).

In a case where the determination unit 134 determines that the capacitance of the fingertip FT is greater than or equal to the selection capacitance threshold TH2 (S41A: Yes), the determination unit 134 increments a timer for a selection time (Step S41B). That is, selection time=selection time+1. This timer is included in the determination unit 134. When the determination unit 134 completes processing in Step S41B, the determination unit 134 causes the process to proceed to Step S42A.

In a case where the determination unit 134 determines in Step S41A that the capacitance of the fingertip FT is not greater than or equal to the selection capacitance threshold TH2 (S41A: No), the determination unit 134 sets the selection time to zero (Step S41C). That is, selection time=0. When the determination unit 134 completes processing in Step S41C, the determination unit 134 causes the process to proceed to Step S42C.

The determination unit 134 determines whether or not the capacitance of the fingertip FT is greater than or equal to the confirmation capacitance threshold TH3 (Step S42A).

In a case where the determination unit 134 determines that the capacitance of the fingertip FT is greater than or equal to the confirmation capacitance threshold TH3 (S42A: Yes), the determination unit 134 increments a timer for a confirmation time (Step S42B). That is, confirmation time=confirmation time+1. This timer is included in the determination unit 134. When the determination unit 134 completes processing in Step S42B, the determination unit 134 causes the process to proceed to Step S43A.

In a case where the determination unit 134 determines in Step S42A that the capacitance of the fingertip FT is not greater than or equal to the confirmation capacitance threshold TH3 (S42A: No), the determination unit 134 sets the confirmation time to zero (Step S42C). That is, confirmation time=0. When the determination unit 134 completes processing in Step S42C, the determination unit 134 causes the process to proceed to Step S43C.

The determination unit 134 determines whether or not the capacitance of the fingertip FT is greater than or equal to the contact capacitance threshold TH4 (Step S43A).

In a case where the determination unit 134 determines that the capacitance of the fingertip FT is greater than or equal to the contact capacitance threshold TH4 (S43A: Yes), the determination unit 134 increments a timer for a contact time (Step S43B). That is, contact time=contact time+1. This timer is included in the determination unit 134. When the determination unit 134 completes processing in Step S43B, the determination unit 134 causes the process to proceed to Step S44A.

In a case where the determination unit 134 determines in Step S43A that the capacitance of the fingertip FT is not greater than or equal to the contact capacitance threshold TH4 (S43A: No), the determination unit 134 sets the contact time to zero (Step S43C). That is, contact time=0. When the determination unit 134 completes processing in Step S43C, the determination unit 134 causes the process to proceed to Step S44A.

The determination unit 134 determines whether or not the proximity time is greater than or equal to the proximity time threshold T1 (Step S44A).

In a case where the determination unit 134 determines that the proximity time is greater than or equal to the proximity time threshold T1 (S44A: Yes), the determination unit 134 sets the relative state to the proximity state (Step S44B). When the determination unit 134 completes processing in Step S44B, the determination unit 134 causes the process to proceed to Step S45A.

In a case where the determination unit 134 determines in Step S44A that the proximity time is not greater than or equal to the proximity time threshold T1 (S44A: No), the determination unit 134 sets the relative state to the non-detection state (Step S44C). When the determination unit 134 completes processing in Step S44C, the determination unit 134 causes the process to proceed to Step S45A.

The determination unit 134 determines whether or not the selection time is greater than or equal to the selection time threshold T2 (Step S45A).

In a case where the determination unit 134 determines that the selection time is greater than or equal to the selection time threshold T2 (S45A: Yes), the determination unit 134 sets the relative state to the selection state (Step S45B). The relative state is overwritten to the selection state from the proximity state or the non-detection state. When the determination unit 134 completes processing in Step S45B, the determination unit 134 causes the process to proceed to Step S46A.

In a case where the determination unit 134 determines in Step S45A that the selection time is not greater than or equal to the selection time threshold T2 (S45A: No), the determination unit 134 causes the process to proceed to Step S46A.

The determination unit 134 determines whether or not the confirmation time is greater than or equal to the confirmation time threshold T3 (Step S46A).

In a case where the determination unit 134 determines that the confirmation time is greater than or equal to the confirmation time threshold T3 (S46A: Yes), the determination unit 134 sets the relative state to the confirmation state (Step S46B). The relative state is overwritten to the confirmation state from the selection state. When the determination unit 134 completes processing in Step S46B, the determination unit 134 causes the process to proceed to Step S47A.

In a case where the determination unit 134 determines in Step S46A that the confirmation time is not greater than or equal to the confirmation time threshold T3 (S46A: No) the determination unit 134 causes the process to proceed to Step S47A.

The determination unit 134 determines whether or not the contact time is greater than or equal to the contact time threshold T4 (Step S47A).

In a case where the determination unit 134 determines that the contact time is greater than or equal to the contact time threshold T4 (S47A: Yes), the determination unit 134 sets the relative state to the contact state (Step S47B). The relative state is overwritten to the contact state from the confirmation state. When completing processing in Step S47B, the determination unit 134 completes a series of relative state determination processing operations (END).

In a case where the determination unit 134 determines in Step S47A that the contact time is not greater than or equal to the contact time threshold T4 (S47A: No), the determination unit 134 completes the series of relative state determination processing operations (END).

Through the above relative state determination processing, the relative state is set to one of the non-detection state, the proximity state, the selection state, the confirmation state, or the contact state.

Note that, in this case, the embodiment has been described in which steps S44A (a proximity time determination), S45A (a selection time determination), S46A (a confirmation time determination), and S47A (a contact time determination) are performed in this order, and the relative state is overwritten in steps S45B, S46B, and S47B. However, the relative state may be determined in the following order. That is, a contact time determination, a confirmation time determination, a selection time determination, and a proximity time determination may be made in this order, and the relative state determined in any one out of these determinations may be written. For example, it is first determined that the contact time is not greater than or equal to the contact time threshold T4. In a case where the contact time is not greater than or equal to the contact time threshold T4, it is second determined whether or not the confirmation time is greater than or equal to the confirmation time threshold T3. In a case where the confirmation time is greater than or equal to the confirmation time threshold T3, it is sufficient that the confirmation state be written as the relative state.

<Key Selection Processing>

Figure 9:
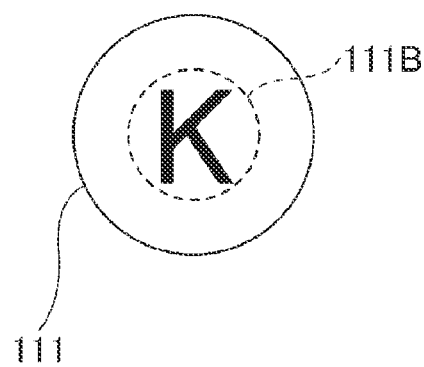
FIG. 9 is a diagram illustrating a central region.

In this case, before describing specific processing about the key selection processing, a central region 111B located at the center of the display region of the GUI button 111 will be described using FIG. 9. FIG. 9 is a diagram illustrating the central region 111B. The central region 111B is a circular region defined by a predetermined radius around the center of the display region of the GUI button 111 and includes the center of the display region of the GUI button 111.

In this case, an embodiment in which the central region 111B is circular will be described; however, the central region 111B may have a shape other than a circle. Note that it is preferable that the central region 111B have the same shape as the display region of the GUI button 111, and these shapes be arranged concentrically. This is because central regions 111B are the central parts of the display regions of the individual GUI buttons 111.

In the key selection processing, a key to be selected through the key selection processing is determined in accordance with the XY coordinates of the fingertip FT by using a duration in which the XY coordinates of the fingertip FT are present inside the central region 111B (a key center time) and a duration in which the XY coordinates of the fingertip FT are present in the display region of the GUI button 111 and outside the central region 111B (a key time).

In this case, a key center time threshold and a key time threshold are used. The key center time threshold is a determination threshold for the key center time, and the key time threshold is a determination threshold for the key time. In a case where the XY coordinates of the fingertip FT are present inside the central region 111B, the key center time threshold is set to a shorter time than the key time threshold in order to more quickly determine a key to be selected.

<Flow Chart of Key Selection Processing>

Figure 10:
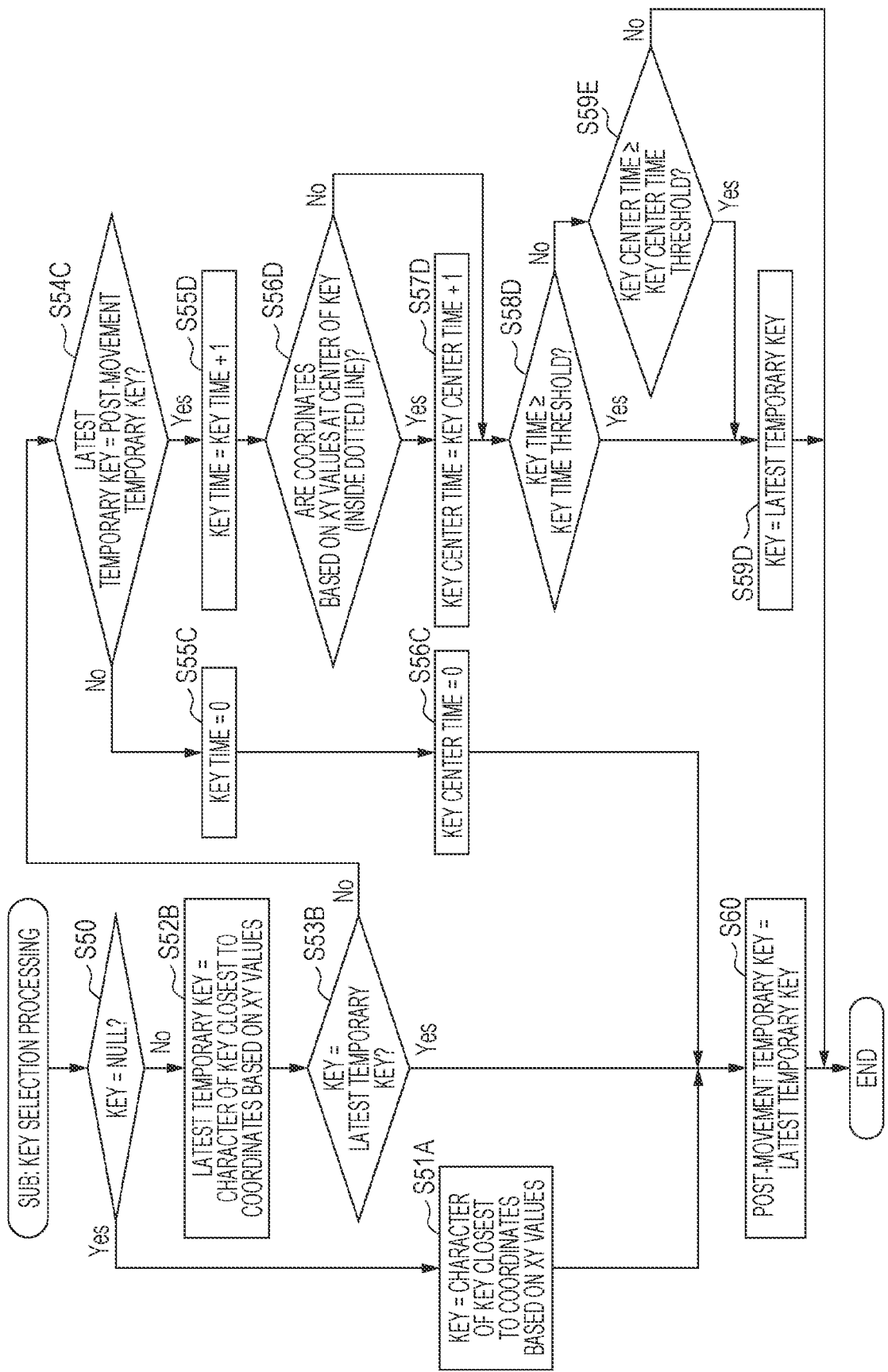
FIG. 10 is a flow chart illustrating key selection processing.

FIG. 10 is a flow chart illustrating the key selection processing. The processing illustrated in FIG. 10 is a subroutine process as Step S15 of FIG. 7. In this case, the latest temporary key is a key selected when the subroutine process as the key selection processing is started and is the key present at the current XY coordinates of the fingertip FT. A post-movement temporary key is the key selected at the time when the subroutine process as the previous key selection processing was performed.

The operation controller 135 determines whether or not the previously selected key (key) is null (Step S50). That is, the operation controller 135 determines whether or not key=null.

In a case where the operation controller 135 determines that key=null (S50: Yes), the character of the key closest to the XY coordinates of the key is selected (Step S51A). The selected key (key) is the character of the key (the GUI button 111) closest to the XY coordinates of the fingertip FT. When the operation controller 135 completes processing in Step S51A, the post-movement temporary key is updated to the latest temporary key (Step S60). The subroutine process as the key selection processing illustrated in FIG. 10 is then complete (END). The key selected in the subroutine process as the key selection processing is the key (the GUI button 111) closest to the XY coordinates of the fingertip FT.

In a case where the operation controller 135 determines in Step S50 that the selected key (key) is not null (S50: No), the operation controller 135 selects the character of the key closest to the XY coordinates of the latest temporary key (Step S52B). Through the processing in Step S52B, the latest temporary key is determined.

The operation controller 135 determines whether or not the selected key (key) is the latest temporary key (Step S53B). The selected key (key) is the GUI button 111 behind which the selection circle 111A is displayed in an overlapping manner.

In a case where the operation controller 135 determines that the selected key (key) is the latest temporary key (S53B: Yes), the operation controller 135 updates the post-movement temporary key to the latest temporary key (Step S60). The subroutine process as the key selection processing is then complete (END). The selected key is the latest temporary key, and the subroutine process as the key selection processing is ended without changing the previous selection result.

In a case where the operation controller 135 determines in Step S53B that the selected key (key) is not the latest temporary key (S53B: No), the operation controller 135 determines whether or not the latest temporary key is identical to the post-movement temporary key (Step S54C).

In a case where the operation controller 135 determines that the latest temporary key is not identical to the post-movement temporary key (S54C: No), the operation controller 135 sets the key time to zero (Step S55C). That is, key time=0.

The operation controller 135 sets the key center time to zero (Step S56C). That is, key center time=0. When the operation controller 135 completes processing in Step S56C, the operation controller 135 updates the post-movement temporary key to the latest temporary key (Step S60). The subroutine process as the key selection processing is then complete (END). By routing the process through steps S55C and S56C, when the XY coordinates of the fingertip FT are moved into the display region of another GUI button 111, the key time and the key center time are reset to zero, and the key time and the key center time for the GUI button 111 and the central region 111B start to be counted.

In a case where the operation controller 135 determines in Step S54C that the latest temporary key is identical to the post-movement temporary key (S54C: Yes), the operation controller 135 increments the key time (Step S55D). That is, key time=key time+1. This timer is included in the operation controller 135.

The operation controller 135 determines whether or not the XY coordinates of the latest temporary key are within the central region 111B of the key (Step S56D).

In a case where the operation controller 135 determines that the XY coordinates of the latest temporary key are within the central region 111B of the key (S56D: Yes), the operation controller 135 increments the key center time (Step S57D). That is, key center time=key center time+1. This timer is included in the operation controller 135. When the operation controller 135 completes processing in Step S57D, the operation controller 135 causes the process to proceed to Step S58D.

In a case where the operation controller 135 determines in Step S56D that the XY coordinates of the latest temporary key are not within the central region 111B of the key (S56D: No), the operation controller 135 causes the process to proceed to Step S58D.

The operation controller 135 determines whether or not the key time is greater than or equal to the key time threshold (Step S58D).

In a case where the operation controller 135 determines that the key time is greater than or equal to the key time threshold (S58D: Yes), the operation controller 135 updates the selected key (key) to the latest temporary key (Step S59D). When completing processing in Step S59D, the operation controller 135 completes the subroutine process as the key selection processing (END). In Step S59D, the selected key (key) is switched to another key (another GUI button 111).

In a case where the operation controller 135 determines in Step S58D that the key time is not greater than or equal to the key time threshold (S58D: No), the operation controller 135 determines whether or not the key center time is greater than or equal to the key center time threshold (Step S59E). This is processing for determining, using the key center time threshold, whether or not the key can be quickly updated to the latest temporary key, the key center time threshold being shorter than the key time threshold.

In a case where the operation controller 135 determines that the key center time is greater than or equal to the key center time threshold (S59E: Yes), the operation controller 135 causes the process to proceed to Step S59D. As a result, in a state where the selected key (key) is updated to the latest temporary key, the subroutine process as the key selection processing is complete (END).

In a case where the operation controller 135 determines in Step S59E that the key center time is not greater than or equal to the key center time threshold (S59E: No), the operation controller 135 completes the subroutine process as the key selection processing (END). This case corresponds to a state shortly after the XY coordinates of the fingertip FT are moved into the display region of another GUI button 111.

As described above, when none of the plurality of durations is greater than or equal to the corresponding time threshold among the plurality of time thresholds (T1 to T4), the control device 130 determines that the relative state is the non-detection state. Moreover, in a case where any one or more durations among the plurality of durations are greater than or equal to the corresponding one or more time thresholds (any one or more of T1 to T4), the control device 130 determines that the relative state is the state having the highest capacitance threshold (one of TH1 to TH4) among one or more states corresponding to the one or more durations. Thus, the relative state can be determined while reducing the effect of noise. Moreover, the plurality of time thresholds (T1 to T4) are short time periods, and thus determinations can be quickly performed.

Thus, the input device 100 can be provided that can quickly determine the position of an object in the plurality of midair sensing layers while reducing the effect of noise. In particular, in the input device according to the embodiment, the relative state is classified into one of the five states, which are the non-detection state, the proximity state, the selection state, the confirmation state, and the contact state, in accordance with the distance between the operation surface 105A and the fingertip FT. The control device 130 can accurately determine the relative state to be any one of many states in a short time.

Moreover, the plurality of states may include the proximity state and the selection state. In the proximity state, the operation surface 105A and the fingertip FT are close to each other. In the selection state, the selection operation is performed to select a GUI button 111 that is visually recognizable on the operation surface 105A. The plurality of capacitance thresholds may include the proximity capacitance threshold TH1 and the selection capacitance threshold TH2 set for the proximity state and the selection state, respectively, and the selection capacitance threshold TH2 may be higher than the proximity capacitance threshold TH1. The plurality of time thresholds may include the proximity time threshold T1 and the selection time threshold T2 set for the proximity state and the selection state, respectively. The control device 130 may determine that the relative state is the selection state in a case where a state where a capacitance is greater than or equal to the selection capacitance threshold TH2 continues for the selection time threshold T2 or longer. The control device 130 may determine that the relative state is the proximity state in a case where the relative state is not the selection state and a state where a capacitance is greater than or equal to the proximity capacitance threshold TH1 continues for the proximity time threshold T1 or longer. The control device 130 may determine that the relative state is the non-detection state in a case where the relative state is not the selection state or the proximity state. Thus, the input device 100 can be provided that can stably determine the selection state, the proximity state, and the non-detection state while reducing the effect of noise.

Moreover, the plurality of states may include the proximity state, the selection state, the confirmation state, and the contact state. In the proximity state, the operation surface 105A and the fingertip FT are close to each other. In the selection state, the selection operation is performed to select a GUI button 111 that is visually recognizable on the operation surface 105A. In the confirmation state, the confirmation operation is performed to confirm an operation input to the GUI button 111 on which the selection operation has been performed on the operation surface 105A. In the contact state, the contact operation is performed to bring the operation surface 105A and the fingertip FT into contact with each other. The plurality of capacitance thresholds may include the proximity capacitance threshold TH1, the selection capacitance threshold TH2, the confirmation capacitance threshold TH3, and the contact capacitance threshold TH4 set for the proximity state, the selection state, the confirmation state, and the contact state, respectively. The contact capacitance threshold TH4 may be higher than the confirmation capacitance threshold TH3. The confirmation capacitance threshold TH3 may be higher than the selection capacitance threshold TH2. The selection capacitance threshold TH2 may be higher than the proximity capacitance threshold TH1. The plurality of time thresholds may include the proximity time threshold T1, the selection time threshold T2, the confirmation time threshold T3, and the contact time threshold T4 set for the proximity state, the selection state, the confirmation state, and the contact state, respectively. The control device 130 may determine that the relative state is the contact state in a case where a state where a capacitance is greater than or equal to the contact capacitance threshold TH4 continues for the contact time threshold T4 or longer.

The control device 130 may determine that the relative state is the confirmation state in a case where the relative state is not the contact state and a state where a capacitance is greater than or equal to the confirmation capacitance threshold TH3 continues for the confirmation time threshold T3 or longer. The control device 130 may determine that the relative state is the selection state in a case where the relative state is not the contact state or the confirmation state and a state where a capacitance is greater than or equal to the selection capacitance threshold TH2 continues for the selection time threshold T2 or longer. The control device 130 may determine that the relative state is the proximity state in a case where the relative state is not the contact state, the confirmation state, or the selection state and a state where a capacitance is greater than or equal to the proximity capacitance threshold TH1 continues for the proximity time threshold T1 or longer. The control device 130 may determine that the relative state is the non-detection state in a case where the relative state is not the contact state, the confirmation state, the selection state, or the proximity state. Thus, the input device 100 can be provided that can stably determine the contact state, the confirmation state, the selection state, the proximity state, and the non-detection state while reducing the effect of noise.

Since the proximity time threshold T1, the selection time threshold T2, the confirmation time threshold T3, and the contact time threshold T4 may be equal to each other, the input device 100 can be provided that can stably determine the contact state, the confirmation state, the selection state, the proximity state, and the non-detection state in equal determination time periods.

Moreover, the input device 100 may further include the display device 110, which is configured to display an image of at least one GUI button 111 that is visually recognizable through the operation surface 105A. The control device 130 may display the standby image on the display device 110 when the relative state is the non-detection state. When the relative state is switched from the non-detection state to the proximity state, the control device 130 may display, on the display device 110, the input image with which it is possible to perform the selection operation on the GUI button 111. Thus, since the image on the display device 110 is switched in accordance with the distance of the fingertip FT to the operation surface 105A, the input device 100 can be provided that is user friendly and with which the user can easily recognize that the selection operation can be performed.

The input device 100 may further include the display device 110, which is configured to display an image of at least one GUI button 111 that is visually recognizable through the operation surface 105A. When the relative state is the selection state, the control device 130 may display, on the display device 110, the selection circle 111A so as to overlap the GUI button 111 selected through the selection operation, the selection circle 111A indicating that the GUI button 111 is selected. Thus, since the selection circle 111A is displayed in accordance with the distance of the fingertip FT to the operation surface 105A, the input device 100 can be provided that is user friendly and with which the user can easily recognize that reception of the selection operation is in progress.

The input device 100 may further include the display device 110, which is configured to display an image of at least one GUI button 111 that is visually recognizable through the operation surface 105A. The control device 130 may confirm, in a case where the confirmation state continues for the confirmation time threshold T3 or longer, the input to the GUI button 111 on which the confirmation operation is performed. Thus, the input device 100 can be provided that is user friendly and with which the user can easily recognize that the input through the confirmation operation has been confirmed in accordance with the distance of the fingertip FT to the operation surface 105A. By distinguishing "the selection state, in which a GUI button 111 can be selected but an input to the GUI button 111 cannot be confirmed" and "the confirmation state, in which the input to the GUI button 111 can be confirmed" from each other in accordance with the distance from the operation surface 105A to the fingertip FT, an erroneous input can be prevented from being confirmed even when the fingertip FT is moved slowly.

The input device 100 may further include the display device 110, which is configured to display an image of at least one GUI button 111 that is visually recognizable through the operation surface 105A. The control device 130 may confirm, in a case where the contact state continues for the contact time threshold T4 or longer, the input to the GUI button 111 on which the contact operation is performed. Thus, the input device 100 can be provided that is user friendly and with which the user can easily recognize that the input through the contact operation performed on the operation surface 105A by the fingertip FT has been confirmed.

Moreover, since the control device 130 may display, on the display device 110, a message indicating that the fingertip FT is in contact with the operation surface 105A when the control device 130 confirms the input to the GUI button 111 on which the contact operation is performed, the input device 100 can be provided that is user friendly and with which the user can easily recognize that a contactless operation can be performed.

In the above, the input device of an exemplary embodiment of the present disclosure has been described; however, the present disclosure is not limited to the specifically disclosed embodiment, and various modifications or changes may be made to the present disclosure without departing from the scope of the claims.

What is claimed is:

1. An input device comprising:
   a top panel having an operation surface;
   a detection unit configured to detect a capacitance corresponding to a distance between the operation surface and an object; and
   a controller configured to determine, based on a detection result from the detection unit, a relative state between the operation surface and the object, which is one of a plurality of states including:
      a non-detection state, in which the object is not detected; and
      a plurality of detection states, for which a corresponding plurality of capacitance thresholds and a corresponding plurality of time thresholds are set,
   wherein the controller is further configured to:
      measure, for each of the plurality of detection states, a duration during which the capacitance is greater than or equal to corresponding one of the plurality of capacitance thresholds;
      determine, for each of a plurality of durations measured and obtained for the plurality of detection states, whether or not the duration is greater than or equal to corresponding one of the plurality of time thresholds;
      determine, if none of the plurality of durations is greater than or equal to the corresponding one of the plurality of time thresholds, that the relative state is the non-detection state; and
      determine, if at least one duration among the plurality of durations is greater than or equal to the corresponding one of the time thresholds, that the relative state is one of the detection states which has a highest capacitance threshold among the at least one detection state corresponding to the at least one duration.

2. The input device according to claim 1,
   wherein the plurality of states include:
      a proximity state, in which the operation surface and the object are in proximity to each other; and
      a selection state, in which a selection operation has been performed to select an operation unit which is visually recognizable on the operation surface,
   wherein the plurality of capacitance thresholds include a proximity capacitance threshold and a selection capacitance threshold, which are set for the proximity state and the selection state, respectively, the selection capacitance threshold being higher than the proximity capacitance threshold,
   wherein the plurality of time thresholds include a proximity time threshold and a selection time threshold, which are set for the proximity state and the selection state, respectively, and
   wherein the controller is configured to determine:
      if the capacitance is greater than or equal to the selection capacitance threshold for a time period equal to or longer than the selection time threshold, that the relative state is the selection state;
      if the relative state is not the selection state and the capacitance is greater than or equal to the proximity capacitance threshold for a time period equal to or longer than the proximity time threshold, that the relative state is the proximity state; and if the relative state is not the selection state or the proximity state, that the relative state is the non-detection state.

3. The input device according to claim 1, wherein the plurality of states include:
- a proximity state, in which the operation surface and the object are in proximity to each other,
- a selection state, in which a selection operation has been performed to select an operation unit which is visually recognizable on the operation surface,
- a confirmation state, in which a confirmation operation has been performed to confirm an input to the operation unit on which the selection operation has been performed, and
- a contact state, in which a contact operation has been is performed to make the operation surface and the object come into contact with each other, wherein the plurality of capacitance thresholds include a proximity capacitance threshold, a selection capacitance threshold, a confirmation capacitance threshold, and a contact capacitance threshold, which are set for the proximity state, the selection state, the confirmation state, and the contact state, respectively, the contact capacitance threshold being higher than the confirmation capacitance threshold, the confirmation capacitance threshold being higher than the selection capacitance threshold, and the selection capacitance threshold being higher than the proximity capacitance threshold, wherein the plurality of time thresholds include a proximity time threshold, a selection time threshold, a confirmation time threshold, and a contact time threshold, which are set for the proximity state, the selection state, the confirmation state, and the contact state, respectively, and wherein the controller is configured to determine:
- if the capacitance is greater than or equal to the contact capacitance threshold for a time period equal to or longer than the contact time threshold, that the relative state is the contact state;
- if the relative state is not the contact state, and if the capacitance is greater than or equal to the confirmation capacitance threshold for a time period equal to or longer than the confirmation time threshold, that the relative state is the confirmation state;
- if the relative state is not the contact state or the confirmation state, and if the capacitance is greater than or equal to the selection capacitance threshold for a time period equal to or longer than the selection time threshold, that the relative state is the selection state;
- if the relative state is not the contact state, the confirmation state, or the selection state, and if the capacitance is greater than or equal to the proximity capacitance threshold for a time period equal to or longer than the proximity time threshold, that the relative state is the proximity state; and
- if the relative state is not the contact state, the confirmation state, the selection state, or the proximity state, that the relative state is the non-detection state.

4. The input device according to claim 3, wherein the proximity time threshold, the selection time threshold, the confirmation time threshold, and the contact time threshold are equal to each other.

5. The input device according to claim 2, further comprising:
a display unit configured to display at least one image of the operation unit which is visually recognizable through the operation surface,
wherein the controller is further configured to control the display unit to display:
- a standby image, if the relative state is the non-detection state, and
- an input image, if the relative state is switched from the non-detection state to the proximity state, the input image allowing the selection operation to be performed on the operation unit.

6. The input device according to claim 2, further comprising:
a display unit configured to display at least one image of the operation unit which is visually recognizable through the operation surface,
wherein the controller is further configured to control the display unit to display, if the relative state is the selection state, a selection image overlapping the operation unit selected through the selection operation, the selection image indicating that the operation unit selected.

7. The input device according to claim 3, further comprising:
a display unit configured to display at least one image of the operation unit which is visually recognizable through the operation surface,
wherein the controller is configured to confirm, if the confirmation state continues for a time period equal to or longer than the confirmation time threshold, an input to the operation unit on which the confirmation operation is performed.

8. The input device according to claim 3, further comprising:
a display unit configured to display at least one image of the operation unit which is visually recognizable through the operation surface,
wherein the controller is configured to confirm, if the contact state continues for a time period equal to or longer than the contact time threshold, an input to the operation unit on which the contact operation is performed.

9. The input device according to claim 8, wherein when the controller confirms the input to the operation unit on which the contact operation is performed, the controller displays, on the display unit, a message indicating that the object is in contact with the operation surface.

* * * * *